US009003281B2

(12) United States Patent
Hashimoto

(10) Patent No.: US 9,003,281 B2
(45) Date of Patent: Apr. 7, 2015

(54) IMAGE PROCESSING APPARATUS CAPABLE OF AUTOMATICALLY GENERATING HELP DOCUMENT FOR WORKFLOW, HELP DOCUMENT GENERATING METHOD AND HELP DOCUMENT GENERATING FORM

(75) Inventor: Masaya Hashimoto, Itami (JP)

(73) Assignee: Konica Minolta, Inc., Tokyo (JP)

( * ) Notice: Subject to any disclaimer, the term of this patent is extended or adjusted under 35 U.S.C. 154(b) by 1735 days.

(21) Appl. No.: 12/176,113

(22) Filed: Jul. 18, 2008

(65) Prior Publication Data

US 2009/0044104 A1 Feb. 12, 2009

(30) Foreign Application Priority Data

Aug. 9, 2007 (JP) ................................. 2007-207505

(51) Int. Cl.
*G06F 17/00* (2006.01)
*G06Q 10/10* (2012.01)
*G06F 17/21* (2006.01)
*G06F 3/12* (2006.01)

(52) U.S. Cl.
CPC .............. *G06Q 10/10* (2013.01); *G06F 17/212* (2013.01); *G06F 3/1203* (2013.01); *G06F 3/1205* (2013.01); *G06F 3/1208* (2013.01)

(58) Field of Classification Search
CPC ... G06F 17/212; G06F 3/1203; G06F 3/1205; G06F 3/1208
USPC ................. 715/254, 714, 838, 273, 762, 776; 358/1.15, 1.9; 719/327
See application file for complete search history.

(56) References Cited

U.S. PATENT DOCUMENTS

| 5,602,625 A * | 2/1997 | Okamoto et al. ................ 399/21 |
| 2003/0189726 A1* | 10/2003 | Kloosterman et al. ........ 358/1.18 |
| 2007/0011612 A1* | 1/2007 | Takemura ...................... 715/705 |
| 2007/0038946 A1* | 2/2007 | Grieshaber et al. ........... 715/762 |
| 2007/0061377 A1* | 3/2007 | Tani .............................. 707/200 |
| 2007/0136117 A1* | 6/2007 | Matsueda ......................... 705/7 |
| 2007/0156648 A1* | 7/2007 | Bridges et al. .................... 707/3 |

FOREIGN PATENT DOCUMENTS

| JP | 4-255061 A | 9/1992 |
| JP | 5-165591 | 7/1993 |
| JP | 2001-282409 | 10/2001 |

OTHER PUBLICATIONS

Japanese Notice of Ground for Rejection mailed on Aug. 18, 2009, directed to corresponding Japanese Patent Application No. 2007-207505; 9 pages.

* cited by examiner

*Primary Examiner* — Quoc A Tran
(74) *Attorney, Agent, or Firm* — Osha Liang LLP

(57) ABSTRACT

To provide a user with an easily understandable help document, the MFP capable of executing a plurality of processes includes a process designation accepting portion to accept designation of at least one of the plurality of processes, a workflow generating portion to generate workflow definition data defining the one or more processes accepted, and a help document generating portion to generate a help document corresponding to the generated workflow. The help document generating portion includes a summary page generating portion to generate a summary page having listed thereon process names for identification of the one or more processes defined by the corresponding workflow definition data.

21 Claims, 21 Drawing Sheets

F I G. 1
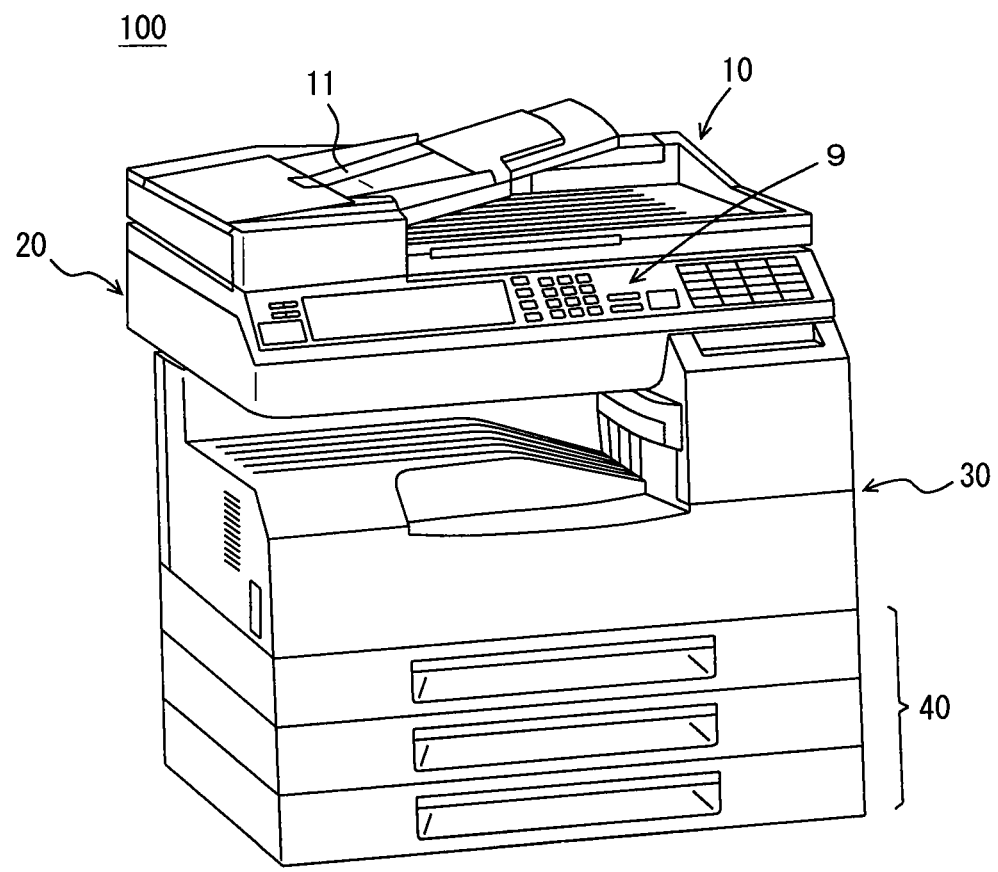

FIG. 5A

| WORKFLOW NO. | REGISTERED NAME | WORKFLOW DEFINITION DATA NAME | HELP DOCUMENT NAME |
|---|---|---|---|
| 1 | CREATE DR BROCHURE | WORKFLOW DEFINITION DATA 1 | HELP DOCUMENT 1 |
| 2 | CREATE PATENT DESCRIPTION | WORKFLOW DEFINITION DATA 2 | HELP DOCUMENT 2 |
| 3 | — | | |

FIG. 5B
WORKFLOW DEFINITION DATA 1

| PROCEDURE | APPLICATION PROGRAM | PROCESS ID | PRESET VALUE | |
|---|---|---|---|---|
| 1 | BOX | InputBOX | — | |
| 2 | BOX | BoxToFTP | FTP SERVER | ftp://aaa.bbb/dr/ |
| | | | FILE FORMAT | PDF |
| 3 | BOX | BoxToEmail | DESTINATION | dr@aaa.bbb |
| | | | FILE FORMAT | PDF |
| 4 | BOX | BoxToPrint | NUMBER OF COPIES | 6 |
| | | | STAPLING | CORNER |
| 5 | BOX | ArrangeBox | | |

FIG. 5C
WORKFLOW DEFINITION DATA 2

| PROCEDURE | APPLICATION PROGRAM | PROCESS ID | PRESET VALUE | |
|---|---|---|---|---|
| 1 | BOX | BoxToPrint | STAMP PAGE | 1/5, 2/5, 3/5, 4/5, 5/5 |
| | | | | PRINTING POSITION: UPPER RIGHT |
| 2 | BOX | BoxToPrint | SAVING BOX | Pat Format |
| | | | FILE NAME | INVENTION PROPOSAL ETC. |
| 3 | COPY | Copy | NUMBER OF COPIES | 1 |
| | | | COLOR | BLACK |
| 4 | SCAN | ScanToFTP | FTP SERVER | ftp://aaa.bbb/pat/ |
| | | | FILE FORMAT | PDF |
| | | | RESOLUTION | 600 × 600dpi |

| PROCESS ID | PROCESS NAME | PROCESS EXPLANATION | PREPARATION TERM |
|---|---|---|---|
| InputBox | BOX REGISTRATION | YOU CAN SAVE THE ORIGINAL IN THE BOX. | PREPARE ORIGINAL. |
| BoxToFTP | FILE TRANSMISSION (FTP) | YOU CAN SEND THE DOCUMENT SAVED IN THE BOX TO DESIGNATED FOLDER WITHIN DESIGNATED PERSONAL COMPUTER (FTP SERVER). | WHEN TRANSMISSION DESTINATION IS NOT DECIDED YET: PREPARE FTP SERVER ADDRESS. WHEN TRANSMISSION DESTINATION IS DECIDED: FTP SERVER ADDRESS IS THE FOLLOWING ADDRESS OK ? {DESTINATION ADDRESS} |
| BoxToEmail | FILE TRANSMISSION (EMAIL) | YOU CAN SEND THE DOCUMENT SAVED IN THE BOX TO DESIGNATED EMAIL DESTINATION. | WHEN TRANSMISSION DESTINATION IS NOT DECIDED YET: PREPARE EMAIL ADDRESS. WHEN TRANSMISSION DESTINATION IS DECIDED: EMAIL ADDRESS IS THE FOLLOWING ADDRESS OK ? {DESTINATION ADDRESS} |
| BoxToPrint | PRINT | YOU CAN DESIGNATE AND INSTRUCT PRINTING OF THE DOCUMENT SAVED IN THE BOX. | — |
| ArrangBox | DOCUMENT ORGANIZATION | YOU CAN CHANGE THE NAME OF THE SAVED DOCUMENT, CHANGE THE SAVING PLACE, COPY, OR DELETE THE DOCUMENT. | — |
| .. | .. | .. | .. |

WORKFLOW
"CREATE DR BROCHURE"

| JOB LIST | |
|---|---|
| 1) Box REGISTRATION | 3/7 |
| 2) FILE TRANSMISSION (FTP) | 4/7 |
| 3) FILE TRANSMISSION (EMAIL) | 5/7 |
| 4) PRINT | 6/7 |
| 5) DOCUMENT ORGANIZATION | 7/7 |

WORKFLOW
"CREATE DR BROCHURE"

PREPARATION TERMS
1) PREPARE ORIGINAL.
2) FTP SERVER ADDRESS
   IS THE FOLLOWING ADDRESS OK ?
   Ftp://aaa.bbb/dr/
3) EMAIL ADDRESS
   IS THE FOLLOWING ADDRESS OK ?
   dr@aaa.bbb

WORKFLOW
"CREATE DR BROCHURE"

1) Box REGISTRATION

YOU CAN SAVE THE ORIGINAL IN THE BOX.

WORKFLOW
"CREATE DR BROCHURE"

2) FILE TRANSMISSION (FTP)

YOU CAN SEND THE DOCUMENT SAVED IN THE BOX TO DESIGNATED FOLDER WITHIN DESIGNATED PERSONAL COMPUTER (FTP SERVER).

WORKFLOW
"CREATE DR BROCHURE"

3) FILE TRANSMISSION (EMAIL)

YOU CAN SEND THE DOCUMENT SAVED IN THE BOX TO DESIGNATED EMAIL DESTINATION.

WORKFLOW
"CREATE DR BROCHURE"

4) PRINT

YOU CAN DESIGNATE AND INSTRUCT PRINTING OF THE DOCUMENT SAVED IN THE BOX.

WORKFLOW
"CREATE DR BROCHURE"

5) DOCUMENT ORGANIZATION

YOU CAN CHANGE THE NAME OF THE SAVED DOCUMENT, CHANGE THE SAVING PLACE, COPY, OR DELETE THE DOCUMENT.

7/7

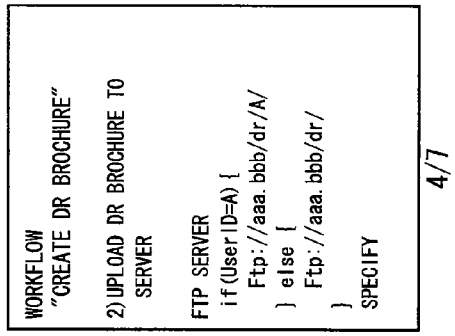

FIG. 8A

WORKFLOW
"CREATE DR BROCHURE"

JOB LIST
1) Box REGISTRATION OF    3/7
   DR ORIGINAL
2) UPLOAD DR BROCHURE     4/7
   TO SERVER
3) TRANSMIT DR BROCHURE   5/7
   TO PARTICIPANTS
4) PRINT DR BROCHURE      6/7
5) DELETE THE ORIGINAL    7/7
   REGISTERED IN THE Box

1/7

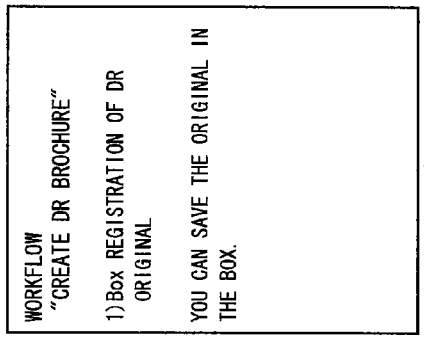

FIG. 8B

WORKFLOW
"CREATE DR BROCHURE"

PREPARATION TERMS
1) PREPARE ORIGINAL OF DR
   BROCHURE.
2) FTP SERVER ADDRESS
   Ftp://aaa.bbb/dr/
3) EMAIL ADDRESS
   dr@aaa.bbb
   SET ADDITIONAL ADDRESSES

2/7

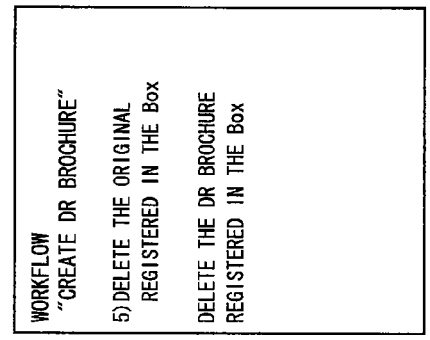

FIG. 8C

WORKFLOW
"CREATE DR BROCHURE"

1) Box REGISTRATION OF DR
   ORIGINAL

YOU CAN SAVE THE ORIGINAL IN
THE BOX.

WORKFLOW
"CREATE DR BROCHURE"

2) UPLOAD DR BROCHURE TO
   SERVER

FTP SERVER
if(UserID=A) {
    Ftp://aaa.bbb/dr/A/
} else {
    Ftp://aaa.bbb/dr/
}
SPECIFY

4/7

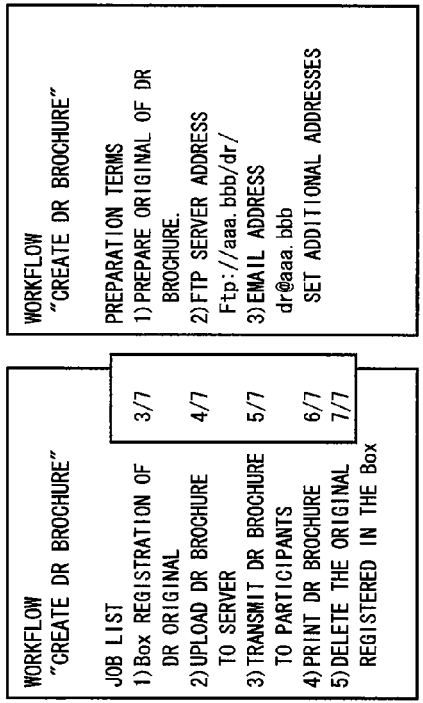

FIG. 8E

WORKFLOW
"CREATE DR BROCHURE"

3) TRANSMIT DR BROCHURE TO
   PARTICIPANTS dr@aaa.bbb
SET ADDITIONAL ADDRESSES

5/7

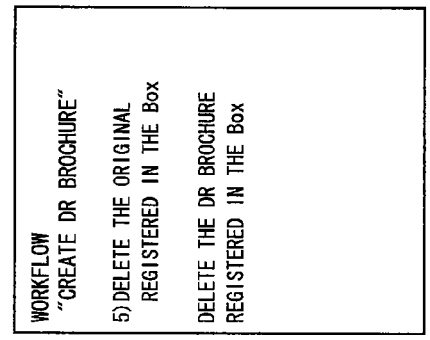

FIG. 8F

WORKFLOW
"CREATE DR BROCHURE"

4) PRINT DR BROCHURE

PRINT THE NECESSARY NUMBER OF
COPIES

6/7

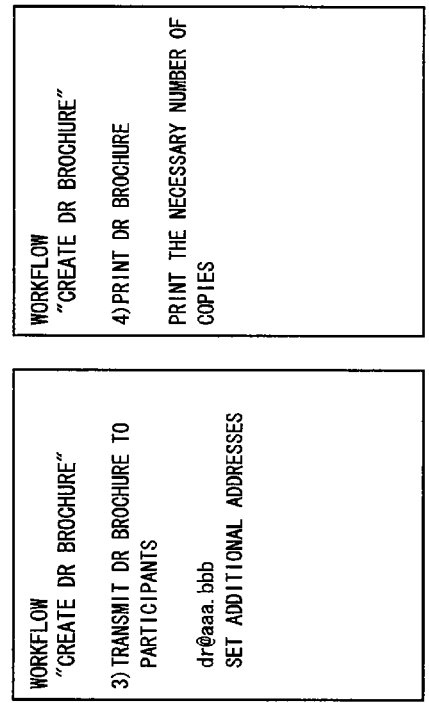

FIG. 8G

WORKFLOW
"CREATE DR BROCHURE"

5) DELETE THE ORIGINAL
   REGISTERED IN THE Box

DELETE THE DR BROCHURE
REGISTERED IN THE Box

7/7

F I G. 9

83

| USER ID | NO. OF INTERRUPTED WORKFLOW | RESTART PROCEDURE NUMBER |
|---|---|---|
| User_A | 1 | 2 |
| User_B | 2 | 1 |
| User_C | 3 | 3 |
| User_A | 2 | 3 |

F I G. 1 7
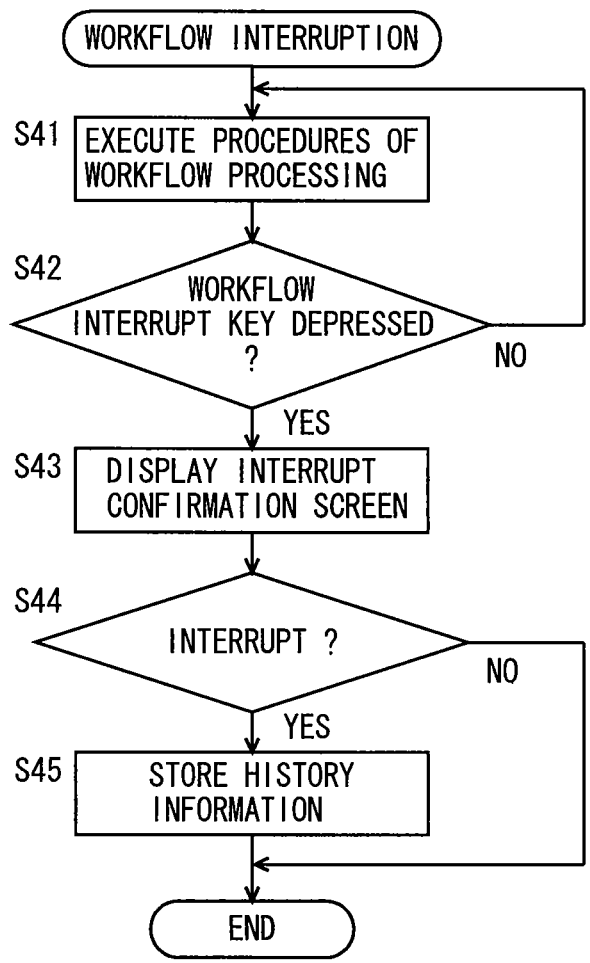

F I G. 1 8
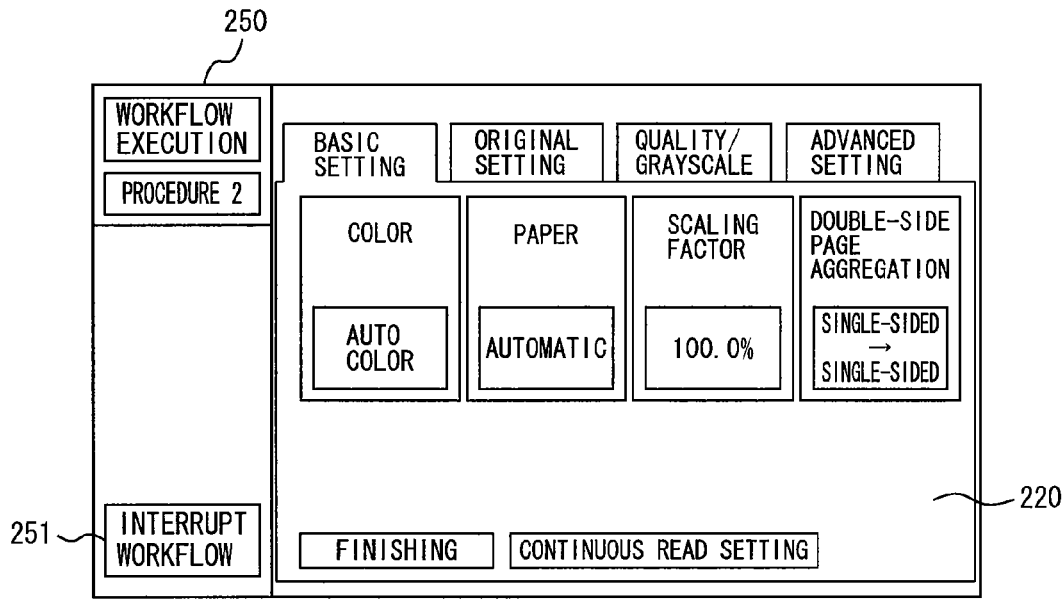
F I G. 1 9
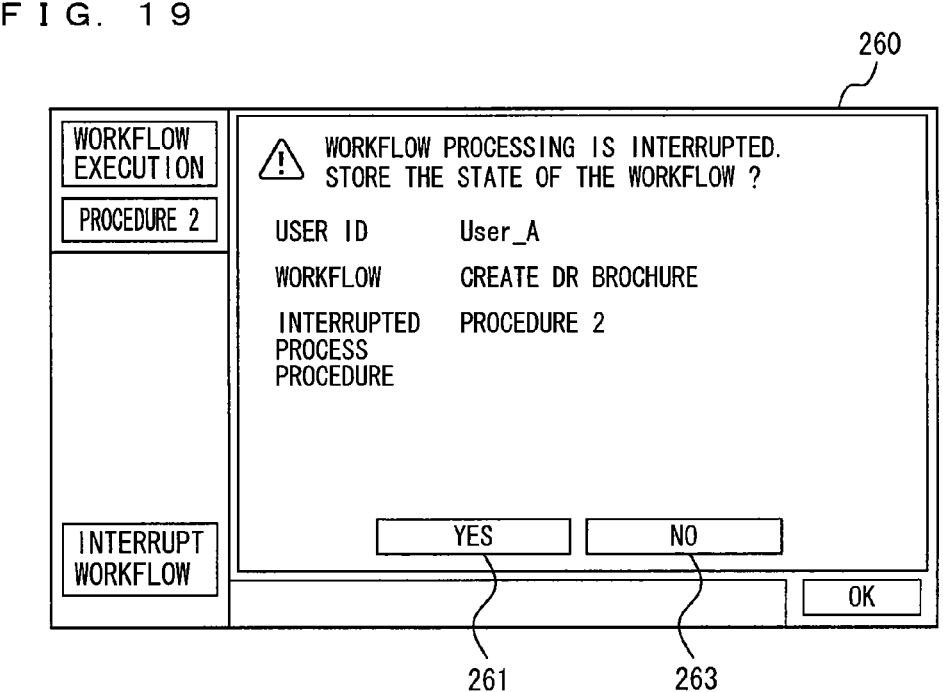

IMAGE PROCESSING APPARATUS CAPABLE OF AUTOMATICALLY GENERATING HELP DOCUMENT FOR WORKFLOW, HELP DOCUMENT GENERATING METHOD AND HELP DOCUMENT GENERATING FORM

This application is based on Japanese Patent Application No. 2007-207505 filed with Japan Patent Office on Aug. 9, 2007, the entire content of which is hereby incorporated by reference.

BACKGROUND OF THE INVENTION

1. Field of the Invention

The present invention relates to an image processing apparatus, a help document generating method and a help document generating program, and more particularly to an image processing apparatus capable of automatically generating a help document for a workflow, a help document generating method and a help document generating program.

2. Description of the Related Art

In recent years, a complex machine called an MFP (Multi Function Peripheral) provided with the functions as a scanner, printer, copier, and facsimile machine has become widespread. In the MFP, it is possible to define a workflow as a combination of a plurality of processes.

Japanese Patent Laid-Open No. 5-165591 discloses a technique where help contents are stored for each operation, and when a process is selected, an operation manual corresponding to the selected process is generated by combining operation guidance necessary for the selected process.

With the technique disclosed in Japanese Patent Laid-Open No. 5-165591, however, the operation manual is generated for each process, which means that for a workflow as a combination of a plurality of processes, operation manuals of the same number as that of the processes are generated. The resulting operation manuals will be complicated and it will be difficult to find a desired operation manual.

SUMMARY OF THE INVENTION

The present invention has been accomplished in view of the foregoing problems, and an object of the present invention is to provide an image processing apparatus capable of providing a user with an easily understandable help document.

Another object of the present invention is to provide a help document generating method enabling generation of a help document easily understandable to a user.

A further object of the present invention is to provide a help document generating program enabling generation of a help document easily understandable to a user.

In order to achieve the objects, according to an aspect of the present invention, there is provided an image processing apparatus capable of executing a plurality of processes, which apparatus includes: a process designation accepting portion to accept designation of at least one of the plurality of processes; a workflow generating portion to generate a workflow defining the one or more processes accepted; and a help document generating portion to generate a help document corresponding to the generated workflow, wherein the help document generating portion includes a summary page generating portion to generate a summary page having listed thereon identification information for identification of each of the one or more processes defined by the corresponding workflow.

According to another aspect of the present invention, there is provided a help document generating method carried out by an image processing apparatus capable of executing a plurality of processes, wherein the method includes the steps of: accepting designation of at least one of the plurality of processes; generating a workflow defining the one or more processes accepted; and generating a summary page having listed thereon identification information for identification of each of the one or more processes defined by the generated workflow.

According to a further aspect of the present invention, there is provided a help document generating program embodied on a computer readable medium for causing a computer controlling an image processing apparatus capable of executing a plurality of processes to execute processing including the steps of: accepting designation of at least one of the plurality of processes; generating a workflow defining the one or more processes accepted; and generating a summary page having listed thereon identification information for identification of each of the one or more processes defined by the generated workflow.

BRIEF DESCRIPTION OF THE DRAWINGS

FIG. 1 is a perspective view showing an MFP according to an embodiment of the present invention.

FIG. 5A shows an example of a workflow definition data list.

FIGS. 5B and 5C show examples of workflow definition data.

FIG. 6 shows an example of help information.

FIGS. 7A through 7G show an example of a help document.

FIGS. 8A through 8G show an example of a customized help document.

FIG. 9 shows an example of history information.

FIG. 17 is a flowchart illustrating an example of the flow of workflow interruption processing.

FIG. 18 shows an example of a screen for display during workflow execution.

FIG. 19 shows an example of an interrupt confirmation screen.

DESCRIPTION OF THE PREFERRED EMBODIMENTS

Figure 2:
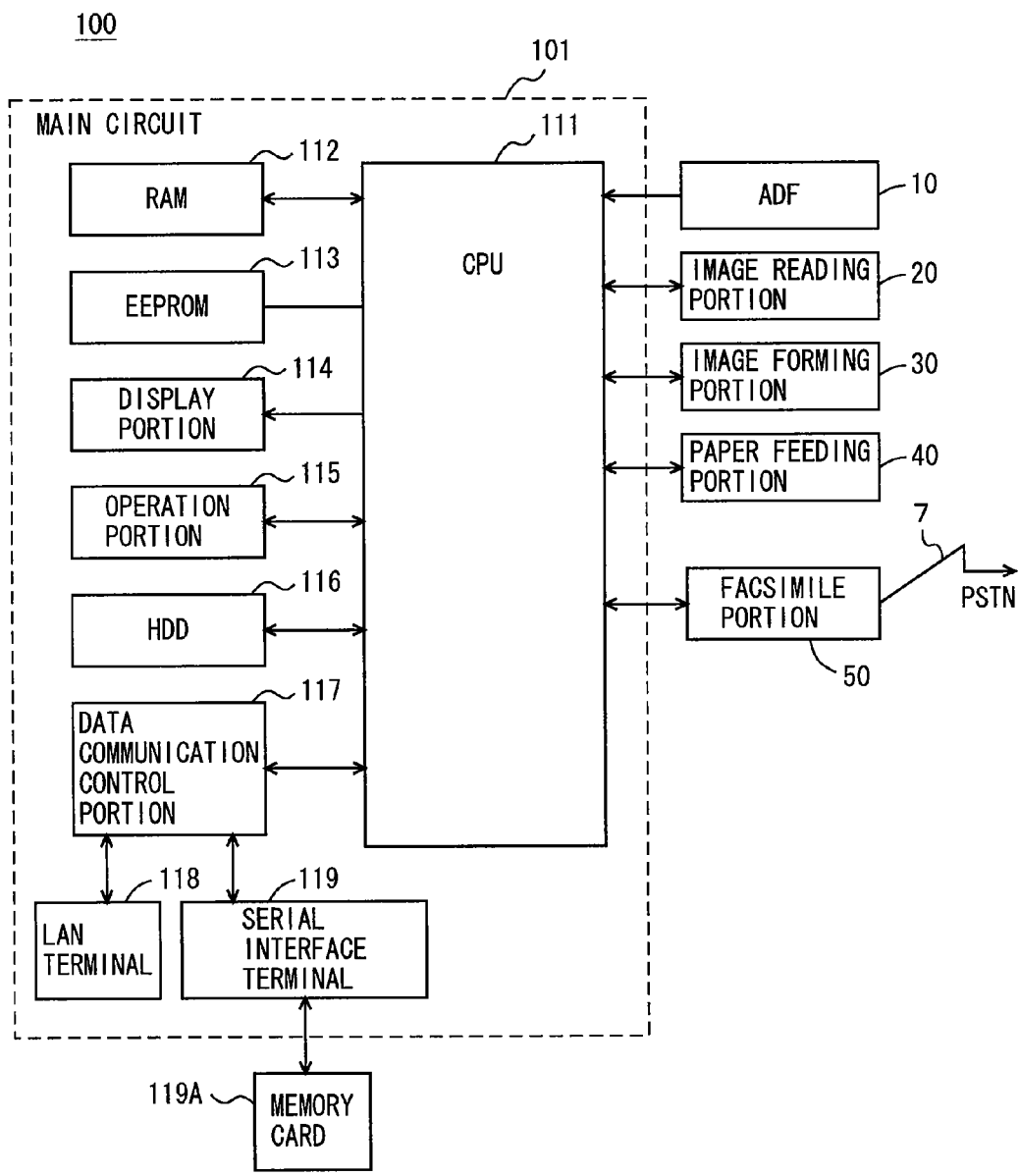
FIG. 2 is a block diagram showing an example of the hardware configuration of the MFP.

Embodiments of the present invention will now be described with reference to the drawings. In the following description, like reference characters denote like parts, which have like names and functions, and therefore, detailed description thereof will not be repeated.

FIG. 1 schematically shows an MFP as an embodiment of the image processing apparatus of the present invention. Referring to FIG. 1, an MFP 100 includes an automatic document feeder (ADF) 10, an image reading portion 20, an image forming portion 30, and a paper feeding portion 40. ADF 10 delivers a plurality of originals mounted on an original platform 11 one by one to image reading portion 20. In response, image reading portion 20 reads image information of photograph, character, picture and the like from the original in an optical manner to acquire image data.

Image forming portion 30, in receipt of the image data, forms an image on a sheet of paper based on the image data. Image forming portion 30 forms an image in color using toners of four colors of cyan, magenta, yellow and black. Alternatively, it forms an image in monochrome using the toner of any of the four colors. Paper feeding portion 40 stores sheets of paper, and supplies them one by one to image forming portion 30. MFP 100 has a top surface provided with an operation panel 9.

FIG. 2 is a block diagram showing an example of the hardware configuration of the MFP. Referring to FIG. 2, MFP 100 further includes a main circuit 101 and a facsimile portion 50. Main circuit 101 is connected to facsimile portion 50, ADF 10, image reading portion 20, image forming apparatus 30, and paper feeding portion 40. Main circuit 101 includes a central processing unit (CPU) 111, a RAM (Random Access Memory) 112 used as a working area for CPU 111, an EEPROM (Electronically Erasable Programmable Read Only Memory) 113 for storing a program executed by CPU 111 and the like, a display portion 114, an operation portion 115, a hard disk drive (HDD) 116 as a mass storage, and a data communication control portion 117. CPU 111 is connected with display portion 114, operation portion 115, HDD 116, and data communication control portion 117, and is responsible for overall control of main circuit 101. CPU 111 is also connected with facsimile portion 50, ADF 10, image reading portion 20, image forming portion 30, and paper feeding portion 40, and is responsible for overall control of MFP 100.

Display portion 114 is a display such as a liquid crystal display (LCD), an organic electro-luminescence display (ELD) or the like, and displays an instruction menu for the user, information about acquired image data, and others. Operation portion 115 is provided with a plurality of keys, and accepts input of data such as instructions, characters and numerical characters, according to the key operations of the user. Operation portion 115 includes a touch panel provided on display portion 114. Display portion 114 and operation portion 115 constitute operation panel 9.

Data communication control portion 117 includes a LAN terminal 118 that is an interface for communication according to a communication protocol such as TCP (Transmission Control Protocol) or UDP (User Datagram Protocol), and a serial interface terminal 119 for serial communication. Data communication control portion 117 transmits and receives data to and from an external apparatus connected to LAN terminal 118 or serial interface terminal 119, in accordance with an instruction from CPU 111.

When a LAN cable for connection to a network is connected to LAN terminal 118, data communication control portion 117 is capable of communicating with another computer via LAN terminal 118.

CPU 111 controls data communication control portion 117 to read a program to be executed by CPU 111 from a memory card 119A, and stores the read program in RAM 112 for execution. It is noted that the recording medium for storing the program to be executed by CPU 111 is not restricted to memory card 119A. It may be a flexible disk, a cassette tape, an optical disc (CD-ROM (Compact Disc-ROM), MO (Magnetic Optical Disc), MD (Mini Disc), DVD (Digital Versatile Disc)), an IC card, an optical card, or a semiconductor memory such as a masked ROM, an EPROM (Erasable Programmable ROM), an EEPROM (Electronically EPROM), or the like. Alternatively, CPU 111 may download the program from a computer connected to the Internet and store the same in HDD 116, or a computer connected to the Internet may write the program to HDD 116, and thereafter, the program stored in HDD 116 may be loaded to RAM 112 for execution by CPU 111. As used herein, the "program" includes, not only the program directly executable by CPU 111, but also a source program, a compressed program, an encrypted program, and others.

Facsimile portion 50 is connected to public switched telephone networks (PSTN) 7, and transmits facsimile data to or receives facsimile data from PSTN 7. Facsimile portion 50 stores the received facsimile data in HDD 116, or causes image forming portion 30 to print the facsimile data on a sheet of paper. Further, facsimile portion 50 converts the data stored in HDD 116 to facsimile data, and outputs the same to a facsimile machine or another MFP connected to PSTN 7. In this manner, it is possible to output the data stored in HDD 116 to the facsimile machine or the other MFP.

Figure 3:
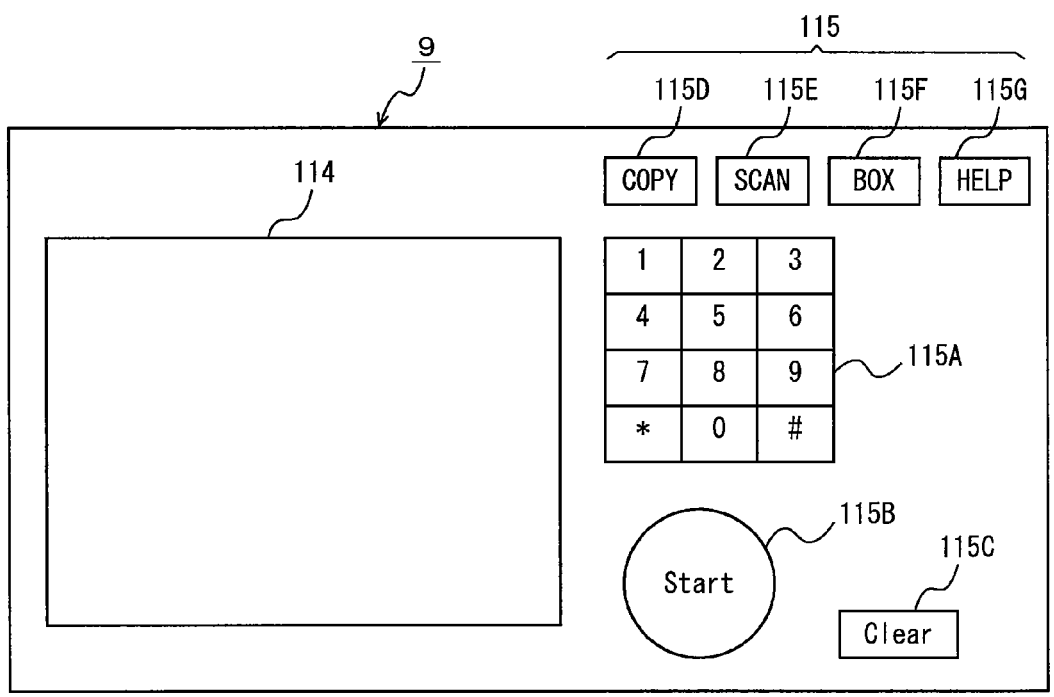
FIG. 3 is a plan view showing an example of an operation panel.

FIG. 3 is a plan view showing an example of the operation panel. Referring to FIG. 3, operation panel 9 includes display portion 114 and operation portion 115. Operation portion 115 includes ten keys 115A, a start key 115B, a clear key 115C to cancel the input content, a copy key 115D to cause MFP 100 to enter a copy mode for execution of a copying process, a scan key 115E to cause MFP 100 to enter a scan mode for execution of a scanning process, a BOX key 115F to cause MFP 100 to enter a data transmission mode for execution of a data transmitting process, and a help key 115G to designate display of a help document.

Figure 4:
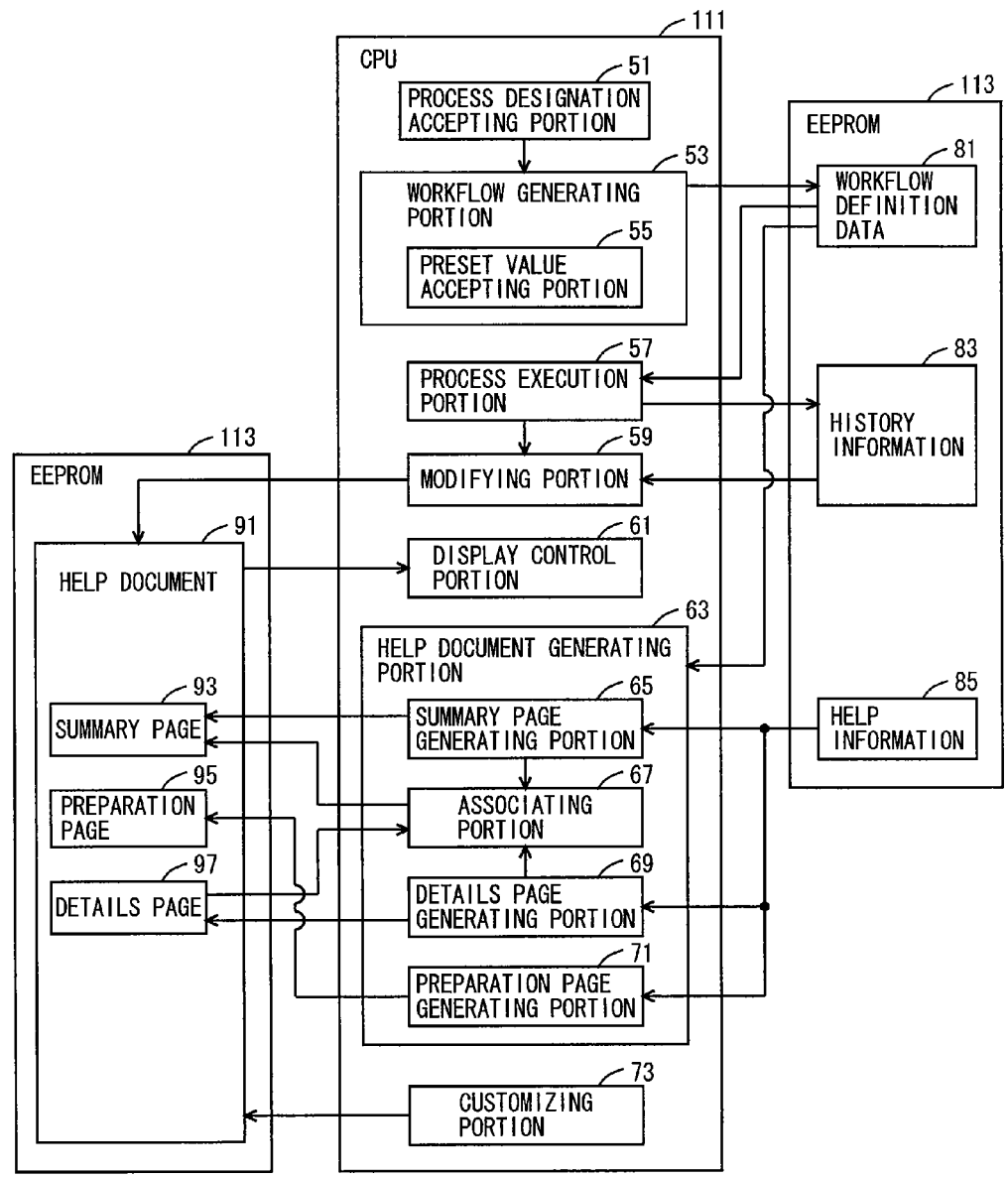
FIG. 4 is a functional block diagram showing an example of the function of a CPU, together with data stored in an EEPROM.

FIG. 4 is a functional block diagram showing an example of the function of the CPU together with data stored in the EEPROM. Referring to FIG. 4, CPU 111 includes a process designation accepting portion 51 to accept designation of a process to be defined in a workflow, a workflow generating portion 53 to generate a workflow, a process execution portion 57 to execute a process, a help document generating portion 63 to generate a help document, a modifying portion 59 to modify a help document, a display control portion 61 to control display portion 114, and a customizing portion 73 to customize a help document.

Process designation accepting portion 51 receives, from operation portion 115, designation of at least one of the processes that can be executed by MFP 100 as the one to be registered in a workflow. Specifically, when a user of MFP 100 inputs to operation portion 115 an operation to cause MFP 100 to execute a process, process designation accepting portion 51 accepts from operation portion 115 the designation of the process corresponding to the operation. For example, in the case of registering a copying process by MFP 100 in a workflow, when the user depresses copy key 115D as the operation for causing MFP 100 to execute the copying process, process designation accepting portion 51 accepts the designation of the copying process. Process designation accepting portion 51 outputs the accepted designation of the process to workflow generating portion 53.

Workflow generating portion 53 generates workflow definition data based on the designation of the process input from process designation accepting portion 51, and stores the same in EEPROM 113. In this manner, workflow definition data 81 is stored in EEPROM 113.

Workflow generating portion 53 includes a preset value accepting portion 55. Preset value accepting portion 55 accepts a preset value for execution of the process corresponding to the operation. Workflow generating portion 53 generates workflow definition data 81 in accordance with the preset value accepted by preset value accepting portion 55. For example, when depression of copy key 115D is detected by process designation accepting portion 51, preset value accepting portion 55 accepts a preset default value as the preset value for the copying process. When the user changes the preset default value for the copying process, preset value accepting portion 55 accepts the preset value thus changed.

Process designation accepting portion 51 can accept designation of a plurality of processes to be registered in a workflow. When accepting designation of a plurality of processes, process designation accepting portion 51 accepts the designation of the processes together with an order in which the processes are to be executed. Workflow generating portion 53 receives the designation of the processes and their executing order accepted by process designation accepting portion 51. Workflow generating portion 53 generates workflow definition data based on the designation of the processes and their executing order accepted by process designation accepting portion 51 as well as on the preset values accepted by preset value accepting portion 55, and stores the generated data in EEPROM 113.

The workflow definition data will now be described. FIG. 5A shows an example of a workflow definition data list. The workflow definition data list includes a workflow No. for identification of each workflow, a registered name attached to the workflow, a workflow definition data name, and a help document name, which are associated with each other. For example, the workflow having the workflow No. "1" is associated with the registered name of "create DR brochure", the workflow definition data name of "workflow definition data 1", and the help document name of "help document 1". The workflow having the workflow No. "2" is associated with the registered name of "create patent description", the workflow definition data name of "workflow definition data 2", and the help document name of "help document 2".

FIG. 5B is a first diagram showing an example of the workflow definition data. FIG. 5B shows the workflow definition data having the workflow definition name of "workflow definition data 1". Referring to FIG. 5B, the workflow definition data includes, for each of a plurality of processes in the workflow, the order of execution (procedure), the name of an application program to be executed, a process ID, and a preset value. The process ID is identification information for identification of a process executable by MFP 100. As the first procedure, a process having the process ID of "InputBOX" included in a BOX application program is defined. No preset value has been set therefor.

As the second procedure, a process having the process ID of "BoxToFTP" included in the BOX application program is defined, and a URL of an FTP server and a file format of the data to be transmitted are set as the preset values.

As the third procedure, a process having the process ID of "BoxToEmail" included in the BOX application program is defined, and an e-mail address as a distribution destination and a file format of the data to be attached to the e-mail are set as the preset values.

As the fourth procedure, a process having the process ID of "BoxToPrint" included in the BOX application program is defined, and the number of copies to be printed and a position where stapling is to be performed as post-processing are set as the preset values.

As the fifth procedure, a process having the process ID of "ArrangeBox" included in the BOX application program is defined, and no preset value is set.

FIG. 5C is a second diagram showing an example of the workflow definition data. FIG. 5C shows the workflow definition data having the workflow definition name of "workflow definition data 2". Referring to FIG. 5C, as the first procedure, execution of a process having the process ID of "BoxToPrint" included in the BOX application program is defined, and values for the Stamp Page for printing the page numbers in the form of "1/5, 2/5, 3/5, 4/5, 5/5" on the upper right are preset.

As the second procedure, execution of a process having the process ID of "BoxToPrint" included in the BOX application program is defined, and for specifying the data to be printed, a saving BOX of "Pat Format" and a file name of "invention proposal etc." are preset.

As the third procedure, execution of a process having the process ID of "Copy" included in a copy application program is defined, and for the copying process, values are preset to indicate that a single copy of an image is to be formed in a black color.

As the fourth procedure, execution of a process having the process ID of "ScanToFTP" included in a scan application program is defined, and a URL of an FTP server, a file format of the data to be transmitted, and resolution for scanning are preset.

Returning to FIG. 4, process execution portion 57 executes processes in accordance with workflow definition data 81. Process execution portion 57 displays a workflow definition data list on display portion 114, and when the user designates at operation portion 115 any of the displayed workflow definition data names, it reads workflow definition data 81 specified by the relevant workflow definition data name from EEPROM 113 for execution. More specifically, it determines an application program to be executed in accordance with the procedure defined in workflow definition data 81, and executes the process specified by the process ID in accordance with the preset values. In the case where no preset value has been set, it awaits an input of the preset value from the user to operation portion 115, and once the preset value is input by the user, it executes the process.

Help document generating portion 63 generates a help document based on workflow definition data 81 and help information 85, and stores the generated help document in EEPROM 113. Help information 85 is prestored in EEPROM 113 and includes an explanation regarding a process executable by MFP 100 and a preparation term as an explanation regarding a preset value for executing the process.

FIG. 6 shows an example of the help information. Referring to FIG. 6, the help information 85 includes, for each process ID, a process name as identification information of the process, a process explanation, and a preparation term, which are associated with each other.

Returning to FIG. 4, help document generating portion 63 includes a summary page generating portion 65 to generate a summary page, a details page generating portion 69 to generate a details page, an associating portion 67 to associate the details page with the summary page, and a preparation page generating portion 71 to generate a preparation page.

Summary page generating portion 65 acquires from help information 85 the process names for every process ID defined in workflow definition data 81, and lists the process names in accordance with the order (procedures) defined in workflow definition data 81 to generate a summary page. Summary page generating portion 65 sets the generated summary page as a first page of the help document.

In the case where workflow definition data 81 has a preset value defined therein, preparation page generating portion 71 generates a preparation page including a preparation term in which the preset value is associated with a procedure for which the relevant preset value is defined. Specifically, preparation page generating portion 71 acquires from help information 85 the preparation terms for every process ID defined in workflow definition data 81, and generates a preparation page by listing the preparation terms in accordance with the procedures defined in workflow definition data 81. If any preset value is defined in workflow definition data 81, preparation page generating portion 71 changes the preparation term corresponding to the procedure for which the preset value is defined, to incorporate the preset value therein. Preparation page generating portion 71 sets the generated preparation page as a second page of the help document.

Details page generating portion 69 reads from help information 85 process explanations corresponding to the process IDs defined in workflow definition data 81 to generate details pages including the process explanations, and sets them as the third and subsequent pages in the help document. Details page generating portion 69 generates one details page for each procedure defined in workflow definition data 81, and sets the generated details pages as the third and subsequent pages.

Associating portion 67 associates the process ID included in the summary page with the details page including an explanation of the process of the corresponding process ID. For example, if the process ID of "InputBox" is defined for the first procedure in workflow definition data 81, the process name of "BOX registration" is included as a first item in the summary page. Associating portion 67 associates the process name of "BOX registration" set as the first item in the summary page with the details page on the third page corresponding to the process ID of "InputBox". For such association, the process name of "BOX registration" set as the first item in the summary page may be associated with a pointer for the third page.

Help document generating portion 63 stores a help document including the summary page, preparation page and details pages thus generated, in EEPROM 113. In this manner, help document 91 is stored in EEPROM 113.

FIGS. 7A through 7G show an example of the help document. FIG. 7A shows an example of the summary page. Shown in FIG. 7A is a summary page for the help document corresponding to workflow definition data 1 shown in FIG. 5B. Referring to FIG. 7A, the summary page 93 includes, as a job list, the process name of "Box registration" as the first procedure, "file transmission (FTP)" as the second procedure, "file transmission (Email)" as the third procedure, "print" as the fourth procedure, and "document organization" as the fifth procedure. Further, the numbers appearing on the right of respective ones of the five process names indicate the page numbers of the corresponding details pages. For example, "3/7" indicated on the right of the process name of "Box registration" for the first procedure indicates that the third page of seven pages in total of help document 91 is the details page corresponding to the process name of "Box registration".

FIG. 7B shows an example of a preparation page in the help document. Shown in FIG. 7B is a preparation page for the help document corresponding to workflow definition data 1 shown in FIG. 5B. Referring to FIG. 7B, the preparation page 95 has indicated therein "Prepare original." as a preparation term corresponding to the process name of "Box registration" as the first procedure. This preparation term is the one defined as the preparation term for the process name of "Box registration" in help information 85 shown in FIG. 6.

As the preparation term for the process name of "file transmission (FTP)" as the second procedure, "FTP server address Is the following address OK? ftp://aaa.bbb/dr/" is indicated. This preparation term includes the value of the preparation term corresponding to the process name of "file transmission (FTP)" in help information 85 shown in FIG. 6 as well as the value of the URL of the FTP server defined as the preset value for the procedure 2 shown in FIG. 5B.

As the preparation term for the process name of "file transmission (Email)" as the third procedure, "Email address Is the following address OK? dr@aaa.bbb" is indicated. This preparation term includes the value of the preparation term corresponding to the process name of "file transmission (Email)" in help information 85 in FIG. 6 and the e-mail address as the distribution destination defined as the preset value for the procedure 3 in FIG. 5B.

No preparation term is indicated for the process names of "print" and "document organization" as the fourth and fifth procedures, because there is no value preset as the preparation terms corresponding to the process names of "print" and "document organization" in help information 85 in FIG. 6.

FIGS. 7C through 7G each show an example of the details page. FIG. 7C shows a details page corresponding to the process name of "Box registration" as the first procedure, and is the third page in help document 91. The details page 97A as the third page includes the process explanation corresponding to the process name of "Box registration" in help information 85 in FIG. 6.

FIG. 7D shows a details page corresponding to the process name of "file transmission (FTP)" as the second procedure, and is the fourth page in help document 91. The details page 97B as the fourth page includes the process explanation corresponding to the process name of "file transmission (FTP)" in help information 85 in FIG. 6.

FIG. 7E shows a details page corresponding to the process name of "file transmission (Email)" as the third procedure, and is the fifth page in help document 91. The details page 97C as the fifth page includes the process explanation corresponding to the process name of "file transmission (Email)" in help information 85 in FIG. 6.

FIG. 7F shows a details page corresponding to the process name of "print" as the fourth procedure, and is the sixth page in help document 91. The details page 97D as the sixth page includes the process explanation corresponding to the process name of "print" in help information 85 in FIG. 6.

FIG. 7G shows a details page corresponding to the process name of "document organization" as the fifth procedure, and is the seventh page in help document 91. The details page 97E as the seventh page includes the process explanation corresponding to the process name of "document organization" in help information 85 in FIG. 6.

Returning to FIG. 4, when workflow definition data 81 is stored in EEPROM 113, help document generating portion 63 automatically generates and stores help document 91 in EEPROM 113. Customizing portion 73 modifies help document 91 automatically generated by help document generating portion 63 in accordance with an operation input by the user. For example, the user may wish to give details to the process explanations in help document 91 automatically generated by help document generating portion 63. Thus, when desired by the user, customizing portion 73 accepts explanations input to operation portion 115 by the user, and replaces the explanations included in the summary page, preparation page, and details pages in help document 91 with the accepted explanations. In this manner, it is possible to modify help document 91 as desired by the user. FIGS. 8A through 8G show an example of a customized version of help document 91 shown in FIGS. 7A through 7G.

Display control portion 61 reads help document 91 from EEPROM 113 for display on display portion 114. When the user inputs to operation portion 115 an instruction to designate one of workflow definition data 81 and depresses help key 115G in operation portion 115, display control portion 61 reads help document 91 corresponding to the designated workflow definition data 81 from EEPROM 113, and displays the summary page of the read help document 91 on display portion 114. When the user inputs an instruction to turn the page forward, it sequentially changes the pages to be displayed on display portion 114. When a process name is designated while the summary page as the first page of help document 91 is being displayed, it displays the details page associated with the designated process name.

Further, when the user inputs an instruction to interrupt execution of the process to operation portion 115, process execution portion 57 interrupts execution of the process even if execution of all the processes defined in workflow definition data 81 is not finished. When process execution portion 57 interrupts the execution of the process, it stores history information 83 in EEPROM 113 and outputs an interrupt signal to modifying portion 59.

FIG. 9 shows an example of history information. Referring to FIG. 9, history information 83 includes a user ID (Identification) for identifying the user who issued the instruction to execute the processes according to workflow definition data 81, a workflow No. for identification of workflow definition data 81 for which the execution of the processes was interrupted by process execution portion 57, and a procedure number (hereinafter, referred to as the "restart procedure number") indicating a first one of the processes yet to be executed from among the plurality of processes defined in the relevant workflow definition data 81.

When an interrupt signal is input from process execution portion 57, modifying portion 59 modifies help document 91 based on history information 83. Specifically, process execution portion 57 stores history information 83 in EEPROM 113 when it outputs the interrupt signal to modifying portion 59. Thus, upon receipt of the interrupt signal, modifying portion 59 reads from EEPROM 113 history information 83 stored by process execution portion 57. Then, modifying portion 59 generates a duplicate of the help document 91 corresponding to the workflow definition data 81 specified by the workflow No. included in history information 83, and stores the duplicated, new help document in EEPROM 113. It then modifies the new help document 91 according to history information 83. Firstly, among the process names listed on the summary page in the new help document 91, the process name of any process having the procedure number preceding the restart procedure number in history information 83 is assigned a mark indicating that the process has been finished. For example, the characters "done" are added to the left of the process name.

Further, among the preparation terms listed on the preparation page in the new help document 91, the preparation term corresponding to any process having the procedure number preceding the restart procedure number in history information 83 is deleted. Furthermore, the details page corresponding to any process having the procedure number preceding the restart procedure number in history information 83 is deleted. The execution of the processes defined in workflow definition data 81 may be restarted after it is interrupted by process execution portion 57. In such a case, the duplicated, new help document 91 is read by display control portion 61 because, in that occasion, it is unnecessary to execute the already executed processes again, and it is also unnecessary to display the explanation and the like for the already executed processes.

Modifying portion 59 associates the new help document 91 modified according to history information 83 with history information 83. Specifically, the workflow No. in history information 83 based on which the new help document 91 was modified is assigned to the new help document 91.

FIGS. 10A through 10F show an example of the new help document. The new help document 91 shown in FIGS. 10A through 10F is the one generated in the case where the processes defined by workflow definition data 1 shown in FIG. 5B are executed by process execution portion 57 and interrupted at the time point when the process having the process name of "Box registration" as the first process procedure is finished. FIGS. 10A through 10F indicate a new help document that is a modified version of help document 91 shown in FIGS. 8A through 8G.

Figure 10A:
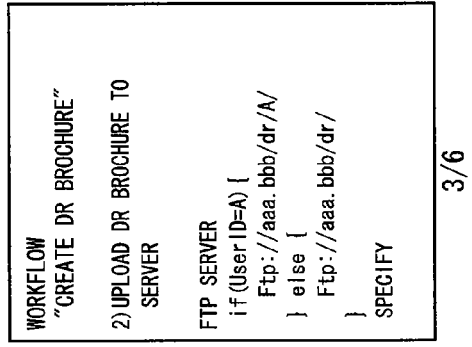
FIGS. 10A through 10F show an example of a new help document.
Figure 10B:
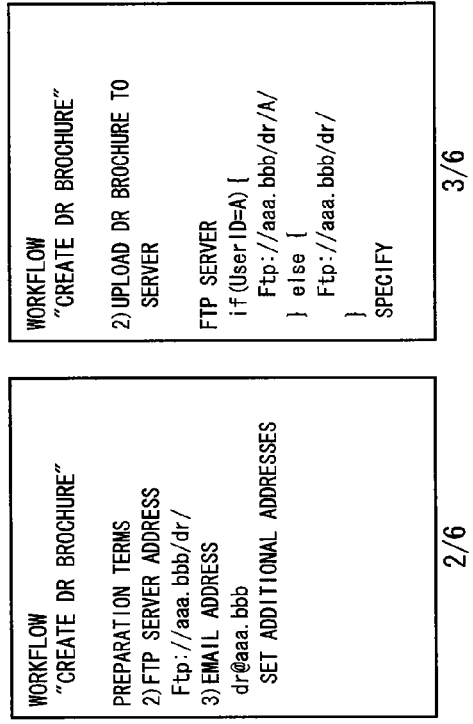
Figure 10D:
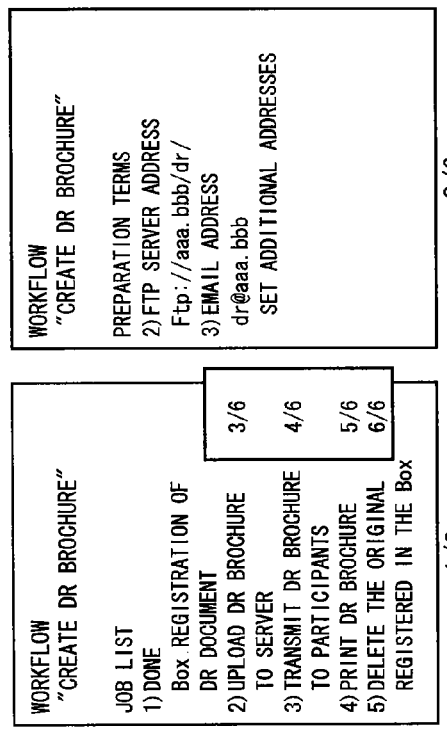
Figure 10C:
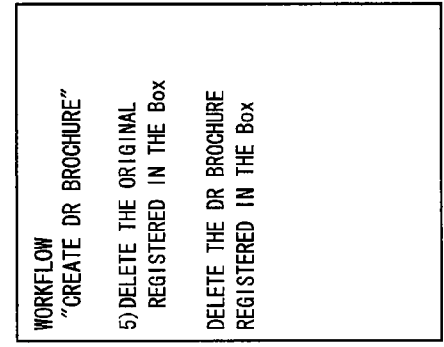
Figure 10E:
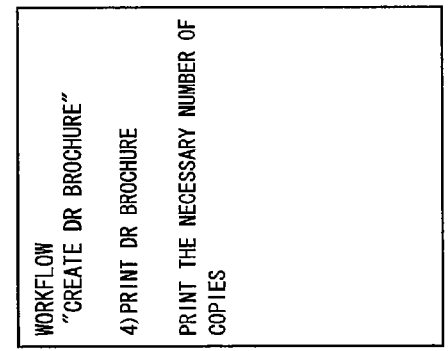
Figure 10F:
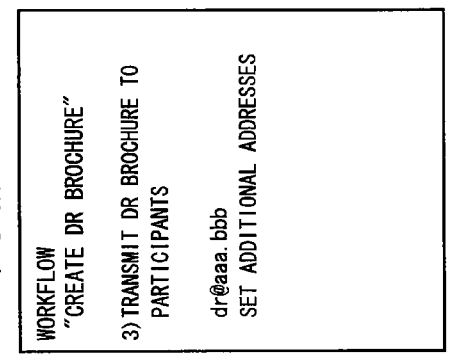

FIG. 10A shows a summary page of the new help document 91. The first process name is modified to "done Box registration of DR original". FIG. 10B shows a preparation page of the new help document 91, in which the preparation term corresponding to the first process has been deleted. Further, the details page corresponding to the first process shown in FIG. 8C has been deleted, and the total number of pages of the new help document has been decreased to six.

When the workflow No. in history information 83 is designated, process execution portion 57 reads workflow definition data 81 specified by the workflow No. in history information 83 from EEPROM 113, and executes the processes from the one corresponding to the procedure specified by the restart procedure number in history information 83. Further, display control portion 61 reads the new help document 91 assigned the workflow No. from EEPROM 113 for display on display portion 114.

Figure 11:
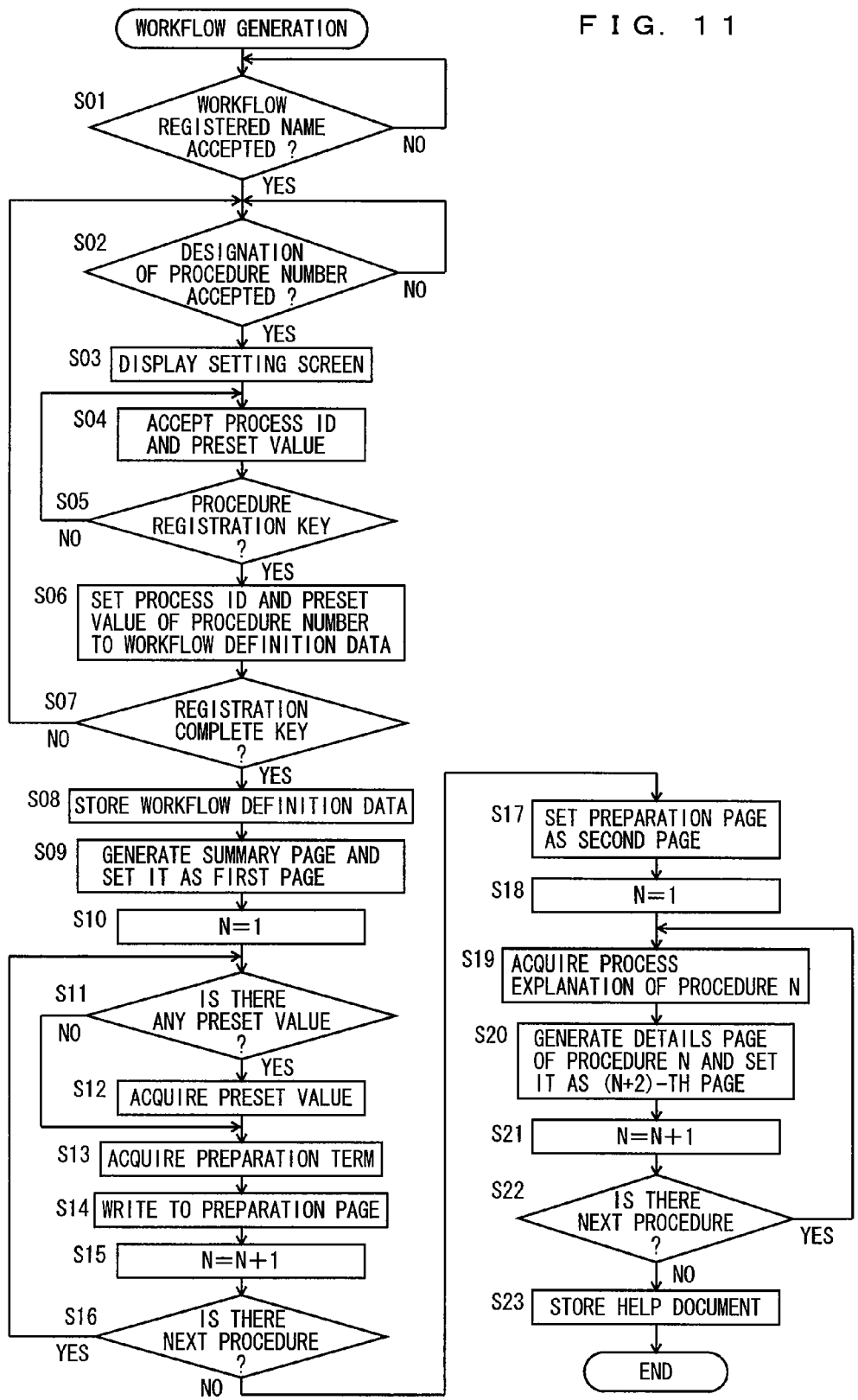
FIG. 11 is a flowchart illustrating an example of the flow of workflow generation processing.

FIG. 11 is a flowchart illustrating an example of the flow of workflow generation processing. The workflow generation processing is carried out by CPU 111 as it executes a workflow generating program stored in EEPROM 113. The workflow generating program is a part of a help document generating program.

Referring to FIG. 11, CPU 111 accepts a registered name of a workflow (step S01). For example, a workflow registration screen is displayed on display portion 114, and a registered name input by the user via the workflow registration screen is accepted. It is then determined whether designation of a procedure number has been accepted (step S02). A procedure setting screen is displayed on display portion 114 to accept designation of a procedure number. CPU 111 is in a standby mode until designation of a procedure number is accepted, and once the designation of the procedure number is accepted, the processing proceeds to step S03. In step S03, a setting screen is displayed. For the setting screen, a setting screen preset as a default in MFP 100 is displayed. For example, a setting screen for inputting an operation to execute a copying process is displayed. The setting screen is changed for example according to an operation input to operation portion 115, and a process ID and a preset value are accepted (step S04). When the user inputs an operation to designate a process to be executed by MFP 100, the process ID determined by the input operation and the preset values for executing the process specified by the process ID are accepted.

Figure 12:
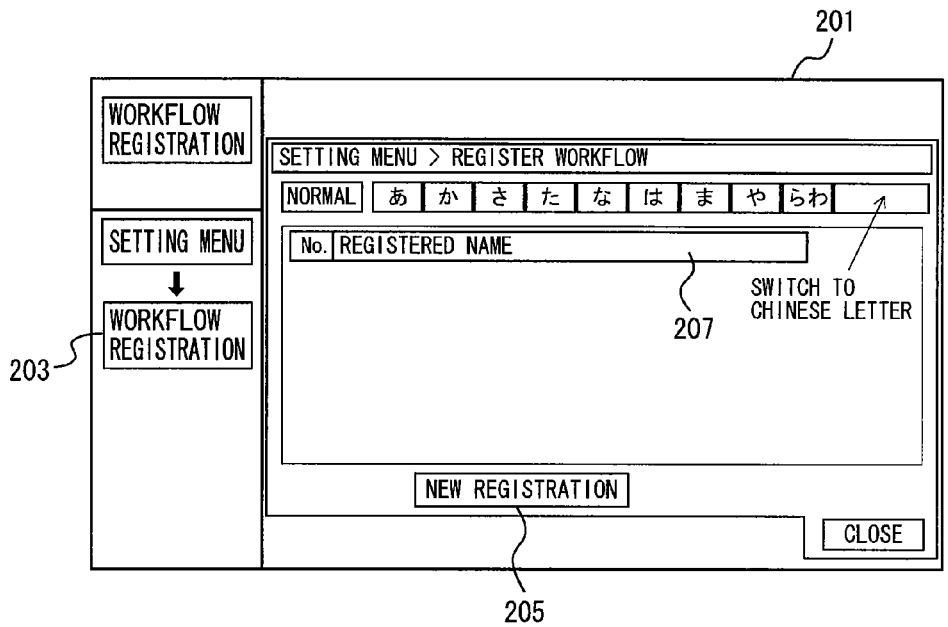
FIG. 12 shows an example of a workflow registration screen.

FIG. 12 shows an example of a workflow registration screen. Referring to FIG. 12, the workflow registration screen 201 includes a button 203 having the characters "register workflow" indicated thereon, a field 207 for inputting a registered name, and a button 205 having the characters "new registration" indicated thereon. When the user designates the button 203, the field 207 is displayed. When the user inputs the registered name of the workflow in the field 207 and designates the button 205, CPU 111 accepts the registered name input to the field 207. CPU 111 then replaces the workflow registration screen displayed on display portion 114 with a procedure registration screen.

Figure 13:
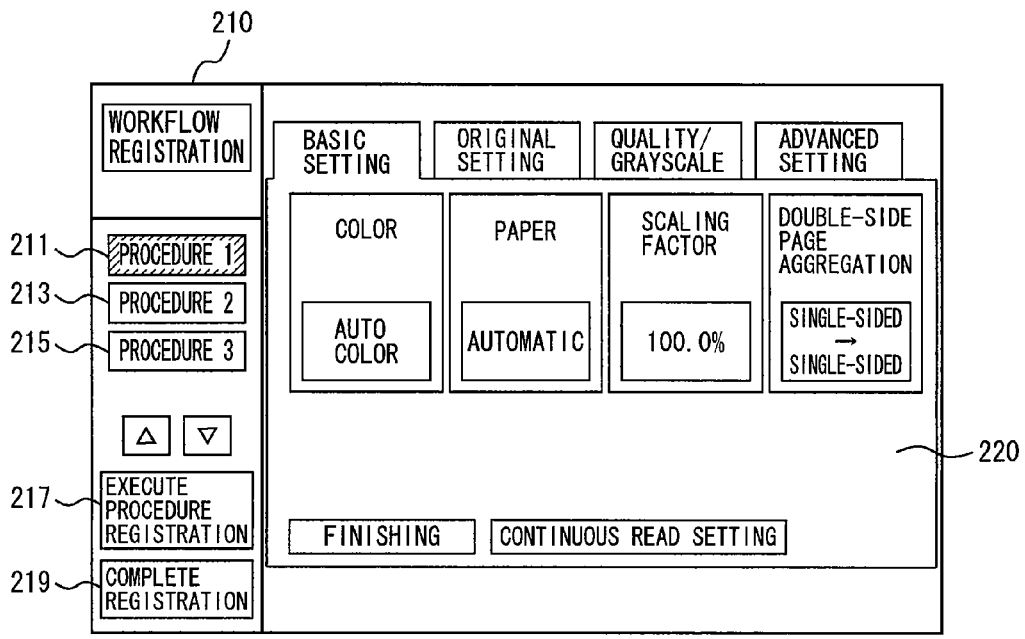
FIG. 13 shows an example of a procedure registration screen.

FIG. 13 shows an example of a procedure registration screen. Referring to FIG. 13, the procedure registration screen 210 includes buttons 211, 213 and 215 for selecting procedures 1, 2 and 3, respectively, a procedure registration key 217 having the characters "execute procedure registration" indicated thereon, and a registration complete key 219 having the characters "complete registration" indicated thereon. Further, a setting screen 220 is displayed on the right side of procedure registration screen 210.

It is possible to select one of buttons 211, 213 and 215, and the selected button is displayed inverted, indicating that it has been selected. In FIG. 13, button 211 is displayed inverted, indicating that procedure 1 has been selected. For the procedure corresponding to the button selected from among buttons 211, 213 and 215, the process ID and the preset values set in setting screen 220 are assigned. While buttons 211, 213 and 215 has been associated with procedures 1, 2 and 3, respectively, when a forward button provided below with a downward arrow is designated, buttons 211, 213 and 215 are newly associated with procedures 4, 5 and 6, respectively. Further, when a backward button provided below with an upward arrow is designated, buttons 211, 213 and 215 return to the previously associated procedures.

Specifically, a copying process is accepted when copy key 115D in operation portion 115 (see FIG. 3) is depressed, a scanning process is accepted when scan key 115E in operation portion 115 is depressed, and a BOX process is accepted when BOX key 115F in operation portion 115 is depressed. In the copying, scanning and BOX processes, copying, scanning, and BOX application programs are executed respectively. Further, in the setting screen predetermined for the accepted process, the process ID is accepted according to the process being set. For example, in response to depression of BOX key 115F, a BOX setting screen is displayed. Further, when setting of the method for outputting the data designated by the BOX is input, the process ID is set. When FTP is set as the output method, BoxToFTP is set as the process ID. BoxToEmail is set as the process ID when e-mail transmission is set, and BoxToPrint is set as the process ID when printing is set.

Further, the preset value predetermined for each preset item included in the setting screen is accepted. The preset item may include: a URL of the FTP server and the file format for the transmitted data in the case where the process ID is BoxToFTP; an e-mail address as a destination of an e-mail and the file format for the transmitted data in the case where the process ID is BoxToEmail; and the number of copies for printing and the position for stapling as post-processing in the case where the process ID is BoxToPrint.

After the preset values predetermined for the respective preset items included in the setting screen are accepted, if the user changes the preset values set for the preset items, the changed preset values are accepted. For the preset item having no preset value predetermined therefor, if the user does not set any preset value, nothing is set for the preset item. It is noted that, instead of initially setting predetermined preset values, the preset values set by the user may be accepted for the respective preset items.

When procedure registration key 217 is designated on the procedure registration screen, the process ID and the preset values set in setting screen 220 for the procedure corresponding to the selected button among buttons 211, 213 and 215 are determined. When registration complete key 219 is designated, the workflow definition data including all the procedures for which the process IDs and the preset values have been determined at that time point is determined.

Returning to FIG. 11, CPU 111 determines whether procedure registration key 217 has been designated on procedure registration screen 210 (step S05). If procedure registration key 217 is designated, the processing proceeds to step S06; otherwise, the processing returns to step S04 and continues accepting the preset values.

In step S06, the process ID and the preset values corresponding to the procedure number are set into the workflow definition data. It is then determined whether registration complete key 219 has been designated (step S07). If registration complete key 219 is designated, the processing proceeds to step S08; otherwise, the processing returns to step S02 to continue accepting the preset values. In step S08, the workflow definition data having the process ID and the preset values set for each procedure number is stored in EEPROM 113. The workflow definition data is provided with the registered name accepted in step S01 before being stored in EEPROM 113. The workflow definition data includes an application program name, which corresponds to a respective process ID.

The processing in step S09 and on is performed on the workflow definition data generated in the processing up to step S08, for generating a help document for the relevant workflow definition data. In step S09, a summary page is generated which lists the process names corresponding to the process IDs included in the workflow definition data in order of the procedure numbers determined by the workflow definition data. The generated summary page is set as the first page in the help document. The process names corresponding to the process IDs are acquired by referring to help information 85.

In the following steps S10 through S17, a preparation page is generated. Firstly, in step S10, a variable N is set to "1". Variable N indicates the order of the process procedure. It is then determined whether a preset value has been set for the process ID having the procedure number of N (step S11). If any preset value is set for the process ID having the procedure number of N, the processing proceeds to step S12; otherwise, the processing proceeds to step S13.

In step S12, a preset value having been set for the process ID having the procedure number of N in the workflow definition data is acquired. In step S13, a preparation term corresponding to the process ID having the procedure number of N is acquired. Specifically, help information 85 stored in EEPROM 113 is read, and the preparation term predetermined for the process ID of procedure N is read.

Then, in step S14, the preparation term is written into the preparation page, and the processing proceeds to step S15. In the case where a preset value is acquired in step S12, the preparation term written into the preparation page corresponds to the one acquired in step S13 to which the preset value acquired in step S12 is added. In the case where a preset value is not acquired in step S12, it corresponds to the one acquired in step S13 to which no preset value is added.

In step S15, variable N is incremented by "1", and the processing proceeds to step S16. In step S16, it is determined whether there exists a next process procedure. If the workflow definition data includes a yet to be executed process procedure, the processing returns to step S11; otherwise, the processing proceeds to step S17. In step S17, the generated preparation page is set as the second page in the help document.

In the following steps S18 through S22, details pages are generated for the respective procedures. Firstly, in step S18, a variable N is set to "1". Variable N indicates the order of the process procedure. Then, the process explanation for the procedure N is acquired (step S19). Specifically, the process explanation predetermined for the process ID of procedure N is read from help information 85 stored in EEPROM 113. A details page for procedure N is generated and set as an "N+2"-th page (step S20). Specifically, a details page including the process explanation read in step S19 is generated, and the generated details page is set as the (N+2)-th page in the help document. As the summary page and the preparation page are already assigned to the first and second pages in the help document, the details pages are assigned to the third and subsequent pages.

In step S21, variable N is incremented by "1", and the processing proceeds to step S22. In step S22, it is determined whether there exists a next process procedure. If the workflow definition data includes a process procedure yet to be processed, the processing returns to step S19; otherwise, the processing proceeds to step S23. In step S23, the help document is stored in EEPROM 113, and the processing is terminated.

Figure 14:
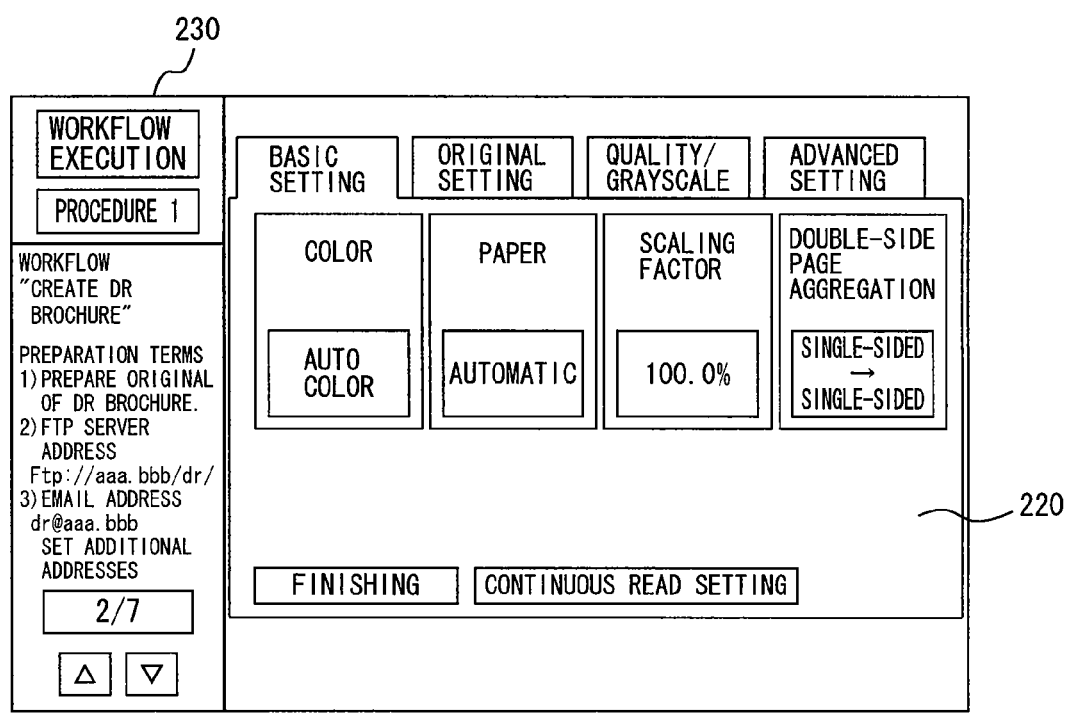
FIG. 14 shows an example of a help display screen.

FIG. 14 shows an example of a help display screen. Referring to FIG. 14, the help display screen 230 shows the case where a preparation page is displayed. The preparation page includes "create DR brochure" as the registered name of the workflow, and displays the preparation terms in order of the process procedures. Here, the preparation page includes the character string of: "Prepare original of DR brochure." as the preparation term for the first process procedure, the character string of: "FTP server address ftp://aaa.bbb/dr/" as the preparation term for the second process procedure, and the character string of: "E-mail address dr@aaa.bbb Set additional addresses." as the preparation term for the third process procedure. Further, help display screen 230 includes the page number "2/7" indicating the position of the preparation page in the help document, and buttons for turning pages forward and back, respectively, in the help document.

Figure 15:
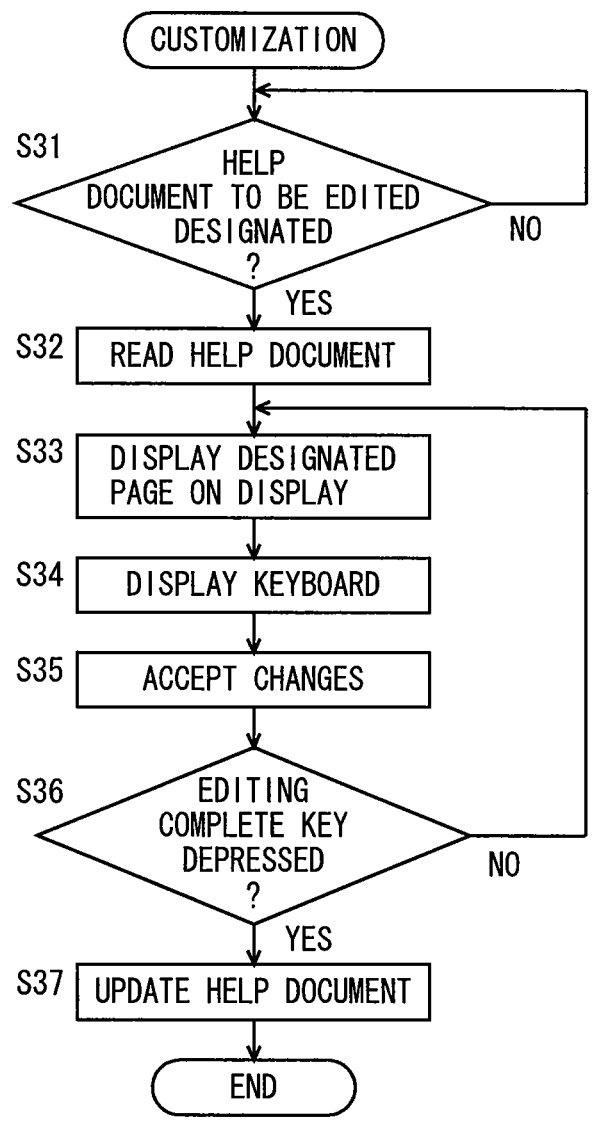
FIG. 15 is a flowchart illustrating an example of the flow of customization processing.

FIG. 15 is a flowchart illustrating an example of the flow of customization processing. The customization processing is carried out by CPU 111 as it executes a customization program stored in EEPROM 113. The customization program is a part of the help document generating program.

Referring to FIG. 15, CPU 111 determines whether a help document to be edited has been designated (step S31). A list of file names of the help documents stored in EEPROM 113 is displayed on display portion 114, and designation of the help document corresponding to the file name designated from the file name list is accepted. CPU 111 is in a standby mode until a help document is designated (NO in step S31), and once the help document is designated (YES in step S31), the processing proceeds to step S32.

In step S32, the help document is read from EEPROM 113. Then, a designated page is displayed on display portion 114 (step S33). Designation of the page is accepted as the user designates via operation portion 115 the button for turning the page forward or the button for tuning it back included in the screen displayed on display portion 114. The accepted page is displayed on display portion 114.

Figure 16:
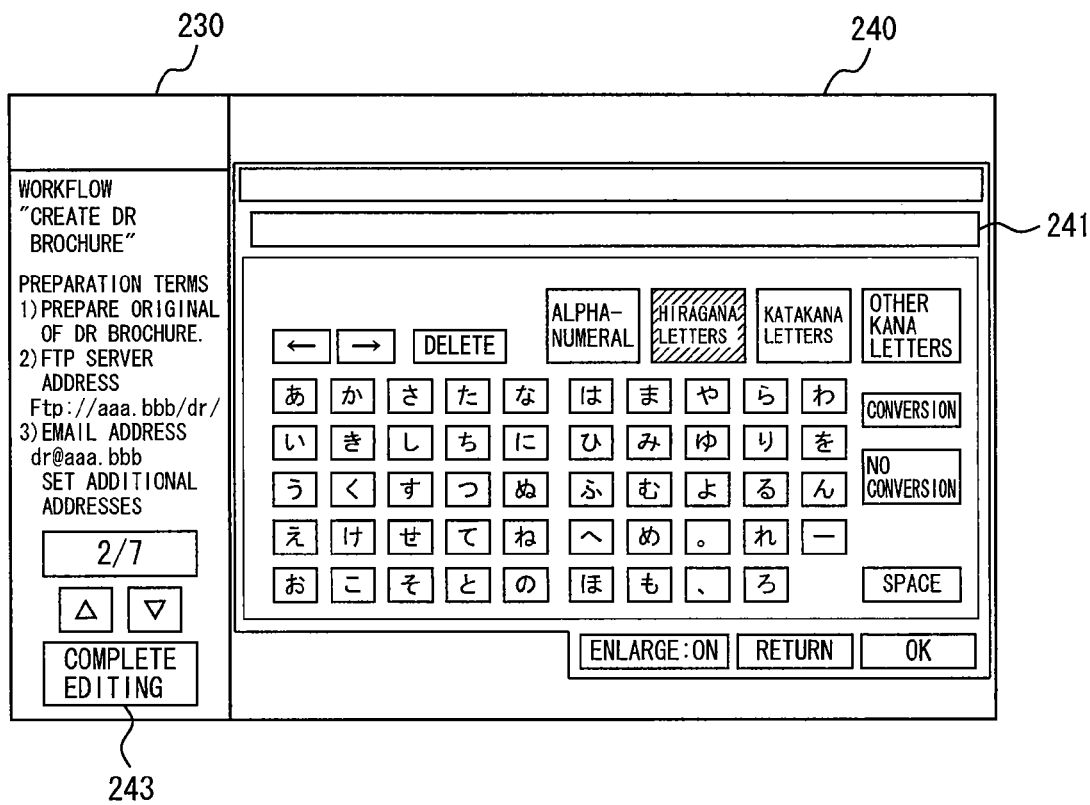
FIG. 16 shows an example of a customization screen.

The keyboard is displayed on display portion 114 (step S34). FIG. 16 shows an example of a customization screen. Referring to FIG. 16, the customization screen 240 includes keys corresponding respectively to the fifty Japanese syllabary characters, punctuations and prescribed symbols, and a field 241 for displaying a target to be edited. When the user designates a plurality of keys among those being displayed, the letters or symbols assigned thereto are accepted by CPU 111. In this manner, the user is allowed to input sentences using the keyboard.

Returning to FIG. 15, CPU 111 accepts modification (step S35). When a portion of the help document to be modified is designated, the designated portion is selected as the editing target, and displayed in the field 241 in customization screen 240. When a delete key is designated after designating an unnecessary part, the unnecessary part is deleted. When the characters to be added are designated after designating the position to insert them, the designated characters are inserted into the designated position.

It is then determined whether an editing complete key has been designated (step S36). Specifically, it is determined whether the editing complete key 243 having the characters "complete editing" indicated thereon on the customization screen has been designated. If editing complete key 243 is designated, the processing proceeds to step S37; otherwise, the processing returns to step S33.

In step S37, the help document is updated. Specifically, help document 91 stored in EEPROM 113 is overwritten with the edited help document.

FIG. 17 is a flowchart illustrating an example of the flow of workflow interruption processing. The workflow interruption processing is carried out by CPU 111 as it executes a workflow interruption program stored in EEPROM 113. The workflow interruption program is a part of the help document generating program.

Referring to FIG. 17, CPU 111 executes workflow processing (step S41). When the workflow generating program shown in FIG. 11 is executed by CPU 111, workflow definition data 81 is stored in EEPROM 113. CPU 111 displays a list of workflow definition data on display portion 114. When the user inputs to operation portion 115 an instruction to select any of the workflow definition data from the list, the relevant workflow definition data 81 is read from EEPROM 113. One or more processes included in the read workflow definition data 81 are executed according to the process procedures. While executing the processes according to workflow definition data 81, CPU 111 displays a screen for display during workflow execution on display portion 114.

FIG. 18 shows an example of a screen for display during workflow execution. Referring to FIG. 18, the screen 250 for display during workflow execution includes: display of the character string of "workflow execution" informing that the workflow is now being executed; display of the character string of "procedure 2" indicating the procedure now being executed; and a workflow interrupt key 251 having the character string of "interrupt workflow" indicated thereon. The screen 250 for display during workflow execution shown in FIG. 18 indicates the state where the process ID and preset values are now being set for execution of the second process procedure according to workflow definition data 81. A setting screen 220 for setting the process ID and preset values for the second process procedure is displayed on the right of the screen 250 for display during workflow execution. Workflow interrupt key 251 is for designating interruption of the processes according to workflow definition data 81.

Returning to FIG. 17, CPU 111 determines whether workflow interrupt key 251 has been depressed during execution of the processes according to workflow definition data 81 (step S42). If workflow interrupt key 251 is depressed, the processing proceeds to step S43; otherwise, the processing returns to step S41 to continue the workflow processing.

In step S43, an interrupt confirmation screen is displayed. FIG. 19 shows an example of the interrupt confirmation screen. Referring to FIG. 19, the interrupt confirmation screen 260 includes a message reading "Workflow processing is interrupted. Store the state of the workflow?", the user ID for identification of the user who instructed the execution of the workflow, the registered name of the workflow definition data, and a field for displaying the procedure number of the process under execution. Further, interrupt confirmation screen 260 includes keys 261 and 263 having the characters "YES" and "NO" indicated respectively thereon.

Returning to FIG. 17, in step S44, it is determined whether to interrupt the workflow processing. If designation of key 261 having "YES" indicated thereon included in interrupt confirmation screen 260 is detected by operation portion 115, it is determined to interrupt the workflow processing. If designation of key 263 having "NO" indicated thereon is detected by operation portion 115, it is determined not to interrupt the workflow processing. If it is determined to interrupt the workflow processing, the processing proceeds to step S45; otherwise, the processing is terminated without further action.

In step S45, history information is stored in EEPROM 113. Here, the first record in history information 83 shown in FIG. 9 is stored in EEPROM 113. Specifically, the record added to history information 83 includes: "User_A" as the user ID for identification of the user who instructed execution of the processes according to workflow definition data 81; "1" as the workflow No. for identification of workflow definition data 81 having been interrupted; and "2" as the procedure number of the first one of a plurality of processes yet to be executed among the processes defined by the relevant workflow definition data 81.

Figure 20:
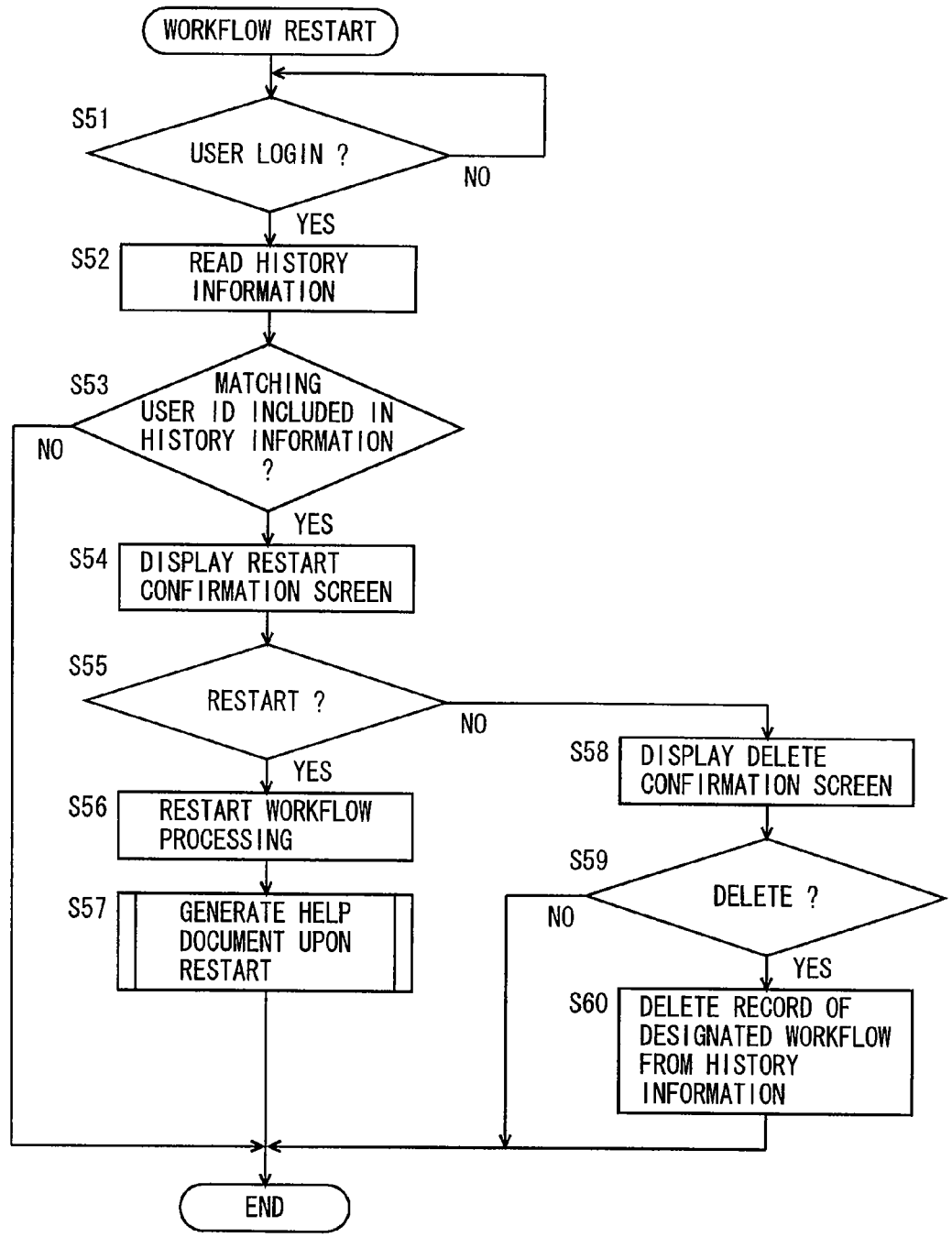
FIG. 20 is a flowchart illustrating an example of the flow of workflow restart processing.

CPU 111 can restart the interrupted workflow. FIG. 20 is a flowchart illustrating an example of the flow of workflow restart processing. The workflow restart processing is carried out by CPU 111 as it executes a workflow restart program. The workflow restart program is a part of the help document generation program.

Referring to FIG. 20, CPU 111 is in a standby mode until user login is detected (NO in step S51), and once the user login is detected, the processing proceeds to step S52. Upon detection of the user login, a user ID for identification of the user who logged in is acquired.

In step S52, history information 83 is read out of EEPROM 113. It is then determined whether the read history information 83 includes a user ID matching the user ID of the logged-in user that was acquired in step S51 (step S53). If history information 83 includes the user ID of the logged-in user, every record including the user ID is extracted from history information 83, and the processing proceeds to step S54. If history information 83 does not include the user ID of the logged-in user, the process is terminated.

Figure 21:
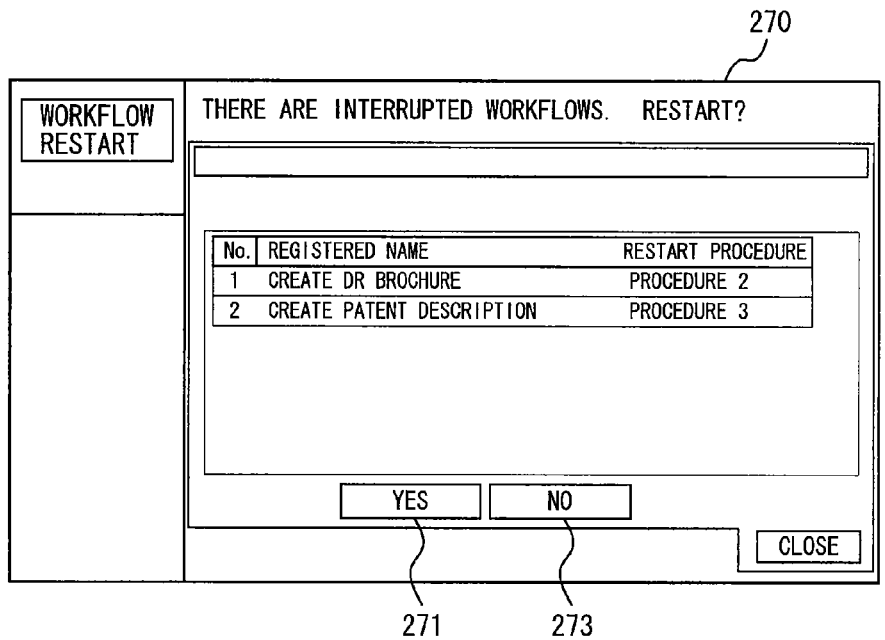
FIG. 21 shows an example of a restart confirmation screen.

In step S54, a restart confirmation screen is displayed on display portion 114. FIG. 21 shows an example of the restart confirmation screen. Referring to FIG. 21, the restart confirmation screen 270 includes fields for displaying a message of: "There are interrupted workflows. Restart?"; a list of registered names of the interrupted workflow processing; and process procedures of the interrupted workflow processing. CPU 111 acquires the workflow Nos. included in the respective records extracted from history information 83 in step S53, acquires the registered names corresponding to the acquired workflow Nos. from the workflow definition data list shown in FIG. 5A, and displays them on restart confirmation screen 270. The process procedures of the interrupted workflow processing correspond to the restart procedure numbers in history information 83. Restart confirmation screen 270 further includes keys 271 and 273 having the characters "YES" and "NO" indicated respectively thereon.

In step S55, it is determined whether to restart the interrupted workflow processing. If any of the registered names of the interrupted workflow processing listed on restart confirmation screen 270 is chosen and designation of the key 271 having "YES" indicated thereon is detected by operation portion 115, it is determined to restart the workflow processing corresponding to the designated registered name. If designation of the key 273 having "NO" indicated thereon is detected by operation portion 115, it is determined not to restart the workflow processing. If it is determined to restart the workflow processing, the processing proceeds to step S56; otherwise, the processing proceeds to step S58. When the processing proceeds to step S56, the record in history information 83 corresponding to the registered name designated by the user from among the registered names of the interrupted workflow processing listed on restart confirmation screen 270 is specified.

In step S56, the workflow processing is restarted. Specifically, the record in history information 83 corresponding to the registered name of which restart was designated by the user in step S55 is specified. Workflow definition data 81 specified by the workflow No. included in the specified record is read, and the processes defined by workflow definition data 81 are executed from the one corresponding to the restart procedure number included in the specified record.

In the following step S57, processing of generating a help document upon restart is carried out, and the processing is terminated. The processing of generating a help document upon restart will be described later.

Figure 22:
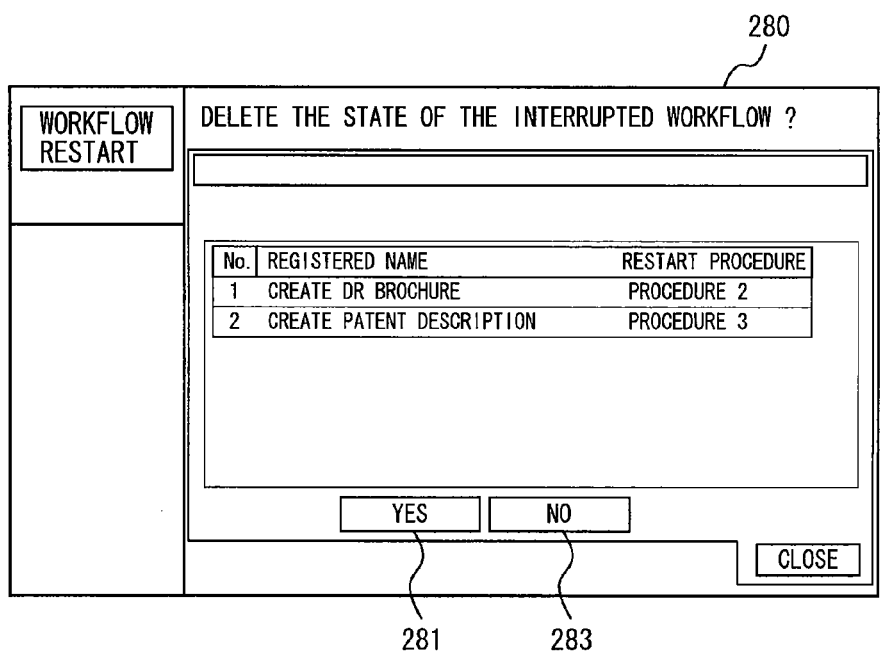
FIG. 22 shows an example of a delete confirmation screen.

Meanwhile, in step S58, a delete confirmation screen is displayed on display portion 114. FIG. 22 shows an example of the delete confirmation screen. Referring to FIG. 22, the delete confirmation screen 280 includes fields for displaying: a message reading "Delete the state of the interrupted workflow?"; a list of the registered names of the interrupted workflow processing; and process procedures of the interrupted workflow processing. CPU 111 acquires the interrupted workflow Nos. included in the respective records extracted from history information 83 in step S53, acquires the registered names corresponding to the acquired workflow Nos. from the workflow definition data list shown in FIG. 5A, and displays them on delete confirmation screen 280. The process procedures of the interrupted workflow processing correspond to the restart procedure numbers in history information 83. Delete confirmation screen 280 further includes keys 281 and 283 having the characters "YES" and "NO" indicated respectively thereon.

In step S59, it is determined whether to delete the interrupted workflow processing. If any of the registered names of the interrupted workflow processing listed on delete confirmation screen 280 is chosen and designation of the key 281 having "YES" indicated thereon is detected by operation portion 115, it is determined to delete the workflow processing corresponding to the designated registered name. If designation of the key 283 having "NO" indicated thereon is detected by operation portion 115, it is determined not to delete the workflow processing. If it is determined to delete any of the workflow processing, the processing proceeds to step S60; otherwise, the processing is terminated. When the processing proceeds to step S60, the record in history information 83 corresponding to the registered name designated by the user from among the registered names of the interrupted workflow processing listed on delete confirmation screen 280 is specified.

In step S60, the record of the designated workflow processing in history information 83 is deleted, and the processing is terminated. Specifically, the record in history information 83 corresponding to the registered name designated by the user from among the registered names of the interrupted workflow processing listed on delete confirmation screen 280 is deleted.

Figure 23:
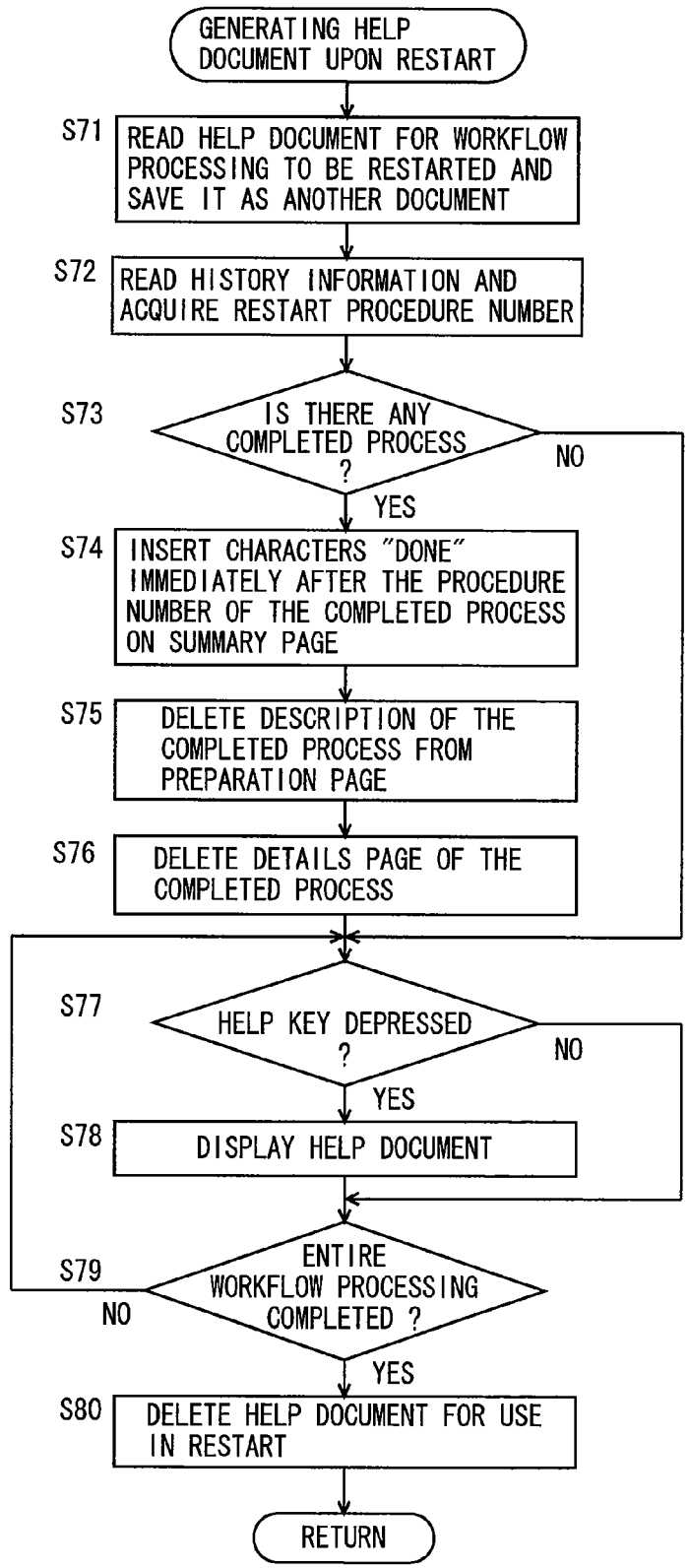
FIG. 23 is a flowchart illustrating an example of the flow of processing of generating a help document upon restart.

FIG. 23 is a flowchart illustrating an example of the flow of the processing of generating a help document upon restart, which is carried out in step S57 in FIG. 20. Referring to FIG. 23, CPU 111 reads a help document for the workflow to be restarted, and saves it as another document (step S71). In restart confirmation screen 270, the registered name of the workflow to be restarted is designated by the user, and the record in history information 83 corresponding to the designated registered name is specified. Then, workflow definition data 81 is specified by the workflow No. included in the specified record in history information 83, and help document 91 corresponding to the specified workflow definition data 81 is specified. The help document thus specified corresponds to the help document for the workflow to be restarted. Hereinafter, the help document for the workflow to be restarted, saved as another document, will be referred to as a "help document for use in restart".

Next, history information 83 is read, and a restart procedure number is acquired (step S72). Specifically, the restart procedure number included in the record in history information 83 corresponding to the registered name designated by the user on restart confirmation screen 270 is acquired.

It is then determined whether there exists any process that has been completed among the processes corresponding to the process IDs included in workflow definition data 81 (step S73). If there is any completed process, the processing proceeds to step S74; otherwise, the processing proceeds to step S77. Specifically, if the restart procedure number acquired in step S72 is not "1", it is determined that there exists one or more completed processes, whereas if the restart procedure number is "1", it is determined that there is no completed process. In steps S74 through S76, the help document for use in restart is modified based on history information 83.

In step S74, the characters "done" are inserted in the summary page of the help document, immediately after the procedure number of the completed process. In the following step S75, description of the completed process is deleted from the preparation page. Further, in step S76, the details page of the completed process is deleted, and the processing proceeds to step S77.

In step S77, it is determined whether help key 115G (see FIG. 3) has been depressed. If depression of help key 115G is detected, the processing proceeds to step S78; otherwise, the processing proceeds to step S79. In step S78, the help document for use in restart is read and displayed on display portion 114, and the processing proceeds to step S79. Firstly, the summary page is displayed, and the relevant page is displayed in accordance with the depression of the page forward or back button. When the procedure name is designated on the summary page, the details page associated with the procedure name is displayed.

Figure 24:
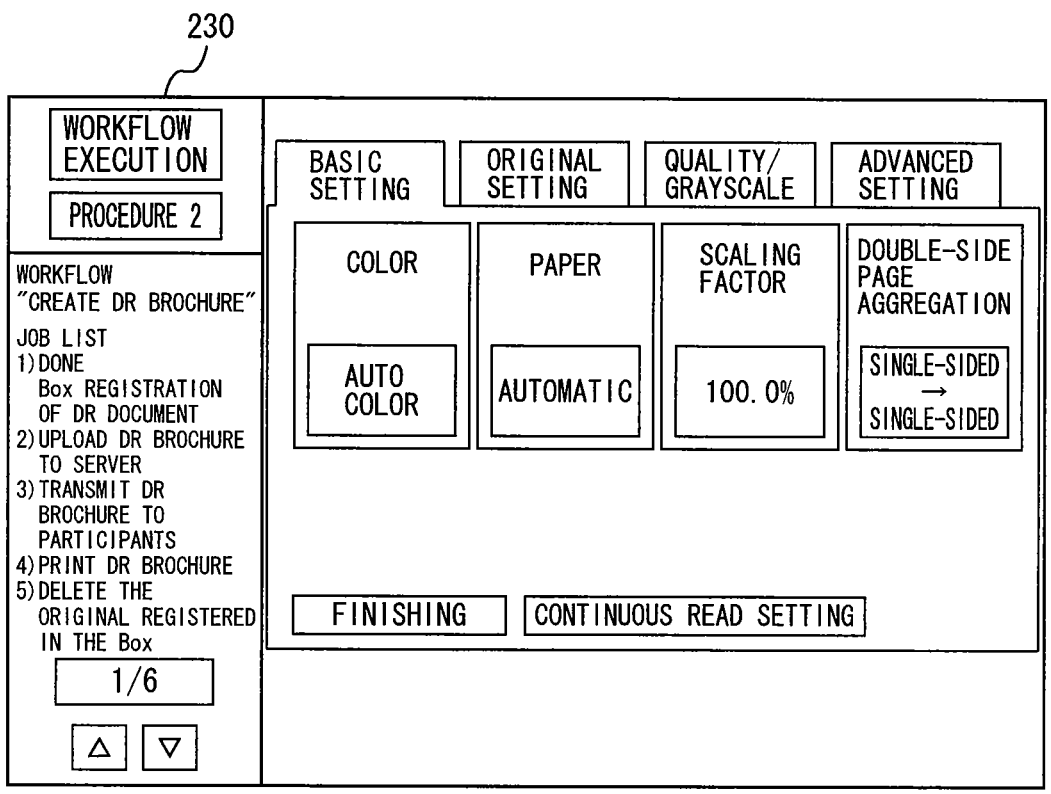
FIG. 24 shows an example of a help display screen displaying a help document for use in restart.

FIG. 24 shows an example of a help display screen displaying the help document for use in restart. Referring to FIG. 24, the summary page of the help document for user in restart is displayed on help display screen 230. The characters "done" are added following the first process procedure number, indicating that the process of the first process procedure has been completed.

Returning to FIG. 23, in step S79, it is determined whether the entire processing defined by the workflow has been completed. If so, the processing proceeds to step S80; otherwise, the processing returns to step S77. In step S80, the help document for use in restart is deleted from EEPROM 113, because the help document for use in restart is no longer necessary as the interrupted workflow processing has been finished. This prevents unnecessary data from being left in EEPROM 113, thereby ensuring effective use of the storage resources.

As described above, according to MFP 100 of the present embodiment, when at least one of a plurality of processes executable by MFP 100 is accepted, workflow definition data 81 defining the one or more processes thus accepted is generated, and help document 91 corresponding to the workflow definition data 81 is generated. Help document 91 includes a summary page 93 listing process names for identification of the process IDs defined in the workflow definition data. When help document 91 is displayed on display portion 114, the summary page is displayed as the first page. The summary page allows the user to see the process names of the process IDs defined by the workflow definition data at one time, and accordingly, it is possible to provide the user with an easily understandable help document.

Further, the process names included in the summary page are associated with the corresponding details pages. This allows the user to readily confirm the process explanation corresponding to a desired process.

When a preset value for executing a process is accepted, a preparation page is generated. The preparation page includes a preset value for a process having a process ID with which the preset value is associated among those defined in the workflow definition data, and includes predetermined explanation for a process having a process ID with which no preset value is associated among those defined in the workflow definition data. This means that the preset values can be preset corresponding to the process IDs in the workflow definition data, which facilitates inputs of the preset values.

When the processing defined by the workflow definition data is interrupted without being executed entirely, a help document corresponding to the workflow definition data is modified based on the history of the interrupted processing. Specifically, of the process names included in the summary page, the one corresponding to the executed process is provided with a mark indicating that it has been executed. In this manner, it is possible to inform the user of the already finished process in the interrupted workflow.

Further, the preset value or the explanation on the preparation page corresponding to the already executed process among the process names included in the summary page is deleted. The information related to the already executed process is deleted, which ensures that the user is not informed of unnecessary information.

Furthermore, of the details pages in help document 91, the details page corresponding to the executed process is deleted. In this manner, it is possible to delete the details page corresponding to the already executed process, which ensures that the user is not informed of unnecessary information.

While MFP 100 has been described as an example of the image processing apparatus in the above embodiment, the present invention may of course be understood as a help document generating method for executing the processing shown in FIGS. 11, 15, 17, 20 and 23, or a help document generating program that causes a computer to execute the help document generating method. Further, the image processing apparatus may be a copier, printer, facsimile machine or the like, not limited to MFP 100.

What is claimed is:

1. An image processing apparatus capable of executing a plurality of processes, the apparatus comprising:
 a process designation accepting portion to accept designation of at least one of said plurality of processes;
 a workflow generating portion to generate a workflow defining said one or more processes accepted;
 a help information storage portion to store help information associating for each of the plurality of processes a process name as identification information for identification of each of the plurality of processes with a process explanation as an explanation of each of the plurality of processes;
 a help document generating portion to generate a help document corresponding to said generated workflow, wherein said help document generating portion includes a summary page generating portion to generate a summary page having listed thereon identification information for identification of each of said one or more processes defined by said corresponding workflow generated by said workflow generating portion;
 a display control portion to control display of the help document generated, and
 a details page generating portion to read one or more help information items corresponding respectively to the one or more processes defined by the generated workflow to generate one or more details pages respectively including the one or more help information items read; and
 an associating portion to associate identification information items of the one or more processes included in the summary page with the one or more details pages generated, wherein the display control portion, in a case where any one of the identification information items of the one or more processes included in the summary page is designated, displays the details page associated with the identification information items designated.

2. The image processing apparatus according to claim 1, further comprising a help document storage portion to store a help document including said summary page and said one or more details pages.

3. The image processing apparatus according to claim 2, wherein said summary page is arranged to precede said one or more details pages.

4. The image processing apparatus according to claim 1, wherein said workflow generating portion includes a preset value accepting portion to accept a preset value for executing said one or more processes accepted, and a preset value associating portion to associate said preset value accepted for each of said one or more processes defined by said workflow with the corresponding process, and said help document generating portion further includes a preparation page generating portion to generate a preparation page, the preparation page including the preset value for any of said one or more processes with which said preset value is associated, and including predetermined explanation for any of said one or more processes with which no preset value is associated.

5. The image processing apparatus according to claim 1, further comprising:
 a process execution portion to execute said one or more processes defined by said generated workflow;
 a history storage portion to store a history of the one or more processes executed by said process execution portion; and
 a modifying portion, when execution of said one or more processes defined in said workflow by said process execution portion is interrupted before completion of all the processes and then said execution is restarted, to modify said help document corresponding to said workflow based on said history stored in said history storage portion.

6. The image processing apparatus according to claim 5, wherein said modifying portion provides a mark indicating that a process has been executed to the identification information of the process executed by said process execution portion from among the identification information of said one or more processes included in said summary page.

7. The image processing apparatus according to claim 5, wherein said workflow generating portion includes a preset value accepting portion to accept a preset value for executing said one or more processes accepted, and a preset value associating portion to associate said preset value accepted for each of said one or more processes defined by said workflow with the corresponding process, said help document generating portion further includes a preparation page generating portion to generate a preparation page, the preparation page including the preset value for any of said one or more processes with which said preset value is associated, and including predetermined explanation for any of said one or more processes with which no preset value is associated, and said modifying portion deletes, from among the preset value or the explanation of said one or more processes included in said preparation page, the preset value or the explanation for the process executed by said process execution portion.

8. The image processing apparatus according to claim 5, further comprising a help information storage portion to store help information for each of said plurality of processes, wherein said help document generating portion further includes a details page generating portion to read one or more help information items corresponding respectively to said one or more processes and generate one or more details pages respectively including said one or more help information items read, and a details page associating portion to associate identification information items of said one or more processes included in said summary page with said generated one or more details pages, respectively, and said modifying portion deletes the details page corresponding to the process executed by said process execution portion from said one or more details pages.

9. The image processing apparatus according to claim 1, wherein the associating portion associates each of identification information items with each of the details pages by associating a pointer corresponding to each of the details pages generated with each of the identification information items included in the summary page.

10. The image processing apparatus according to claim 1, wherein the display control portion displays the summary page in response to an instruction from a user.

11. A help document generating method carried out by an image processing apparatus capable of executing a plurality of processes, the method comprising:
 accepting designation of at least one of said plurality of processes;

generating a workflow defining said one or more processes accepted;

storing help information associating for each of the plurality of processes a process name as identification information for identification of each of the plurality of processes with a process explanation as an explanation of each of the plurality of processes;

generating a help document corresponding to said generated workflow;

generating a summary page having listed thereon identification information for identification of each of said one or more processes defined by said generated workflow generated by said workflow generating;

controlling display of the help document generated;

reading one or more help information items corresponding respectively to the one or more process defined by the generated workflow to generate one or more details pages respectively including the one or more help information items read;

associating identification information items of the one or more process included in the summary page with the one or more details pages generated; and when any of the identification information items of the one or more processes included in the summary page is designated, displaying the details page associated with the identification information items designated.

12. The help document generating method according to claim 11, further comprising storing a help document including said summary page and said one or more details pages.

13. The help document generating method according to claim 12, further comprising arranging said summary page to precede said one or more details pages.

14. The help document generating method according to claim 11, further comprising:

executing said one or more processes defined by said generated workflow;

storing a history of the one or more processes executed; and when execution of said one or more processes defined by said workflow is interrupted before completion of all the processes and then said execution is restarted, modifying said summary page corresponding to said workflow based on said stored history.

15. The help document generating method according to claim 14, wherein said modifying includes providing a mark indicating that a process has been executed to the identification information of the executed process from among the identification information of said one or more processes included in said summary page.

16. The help document generating method according to claim 14, wherein said generating a workflow includes accepting a preset value for executing said one or more processes accepted, and associating said preset value accepted for each of said one or more processes defined by said workflow with the corresponding process, said help document generating method further comprises generating a preparation page, the preparation page including the preset value for any of said one or more processes with which said preset value is associated, and including predetermined explanation for any of said one or more processes with which no preset value is associated, and said modifying includes deleting, from among the preset value or the explanation of said one or more processes included in said preparation page, the preset value or the explanation for the executed process.

17. The help document generating method according to claim 14, further comprising:

storing help information for each of said plurality of processes;

reading one or more help information items corresponding respectively to said one or more processes to generate one or more details pages respectively including said one or more help information items read; and associating identification information items of said one or more processes included in said summary page with said one or more details pages generated; said modifying including deleting the details page corresponding to the executed process from among said one or more details pages.

18. The help document generating method according to claim 11, wherein the associating associates each of identification information items with each of the details pages by associating a pointer corresponding to each of the details pages generated with each of the identification information items included in the summary page.

19. The help document generating method according to claim 11, wherein the displaying displays the summary page in response to an instruction from a user.

20. A help document generating method carried out by an image processing apparatus capable of executing a plurality of processes, the method comprising:

accepting designation of at least one of said plurality of processes;

generating a workflow defining said one or more processes accepted;

storing help information associating for each of the plurality of processes a process name as identification information for identification of each of the plurality of processes with a process explanation as an explanation of each of the plurality of processes;

generating a summary page having listed thereon identification information for identification of each of said one or more processes defined by said generated workflow, wherein said generating a workflow includes accepting a preset value for executing said one or more processes accepted, and associating said preset value accepted for each of said one or more processes defined by said workflow with the corresponding process, and said help document generating method further comprises generating a preparation page, the preparation page including the preset value for any of said one or more processes with which said preset value is associated, and including predetermined explanation for any of said one or more processes with which no preset value is associated;

controlling display of the help document generated;

reading one or more help information items corresponding respectively to the one or more processes defined by the generated workflow to generate one or more details pages respectively including the one or more help information items read;

associating identification information items of the one or more processes included in the summary page with the one or more details pages generated; and when any one of the identification information items of the one or more processes included in the summary page is designated, displaying the details page associated with the identification information items designated.

21. A help document generating program embodied on a non-transitory computer readable medium for causing a computer controlling an image processing apparatus capable of executing a plurality of processes to execute processing including:

accepting designation of at least one of said plurality of processes;

generating a workflow defining said one or more processes accepted;

storing help information associating for each of the plurality of processes a process name as identification information for identification of each of the plurality of processes with a process explanation as an explanation of each of the plurality of processes;
generating a help document corresponding to said generated workflow;
generating a summary page having listed thereon identification information for identification of each of said one or more processes defined by said generated workflow generated by said workflow generating;
controlling display of the help document generated;
reading one or more help information items corresponding respectively to the one or more processes defined by the generated workflow to generate one or more details pages respectively including the one or more help information items read;
associating identification information items of the one or more processes included in the summary page with the one or more details pages generated; and
when any one of the identification information items of the one or more processes included in the summary page is designated, displaying the details page associated with the identification information items designated.

* * * * *